(12) United States Patent
Wasmund

(10) Patent No.: US 10,058,784 B2
(45) Date of Patent: Aug. 28, 2018

(54) GAME SYSTEMS WITH INTEROPERATING OR BOTH INTEROPERATING AND INTERRELATED QUIZZES AND/OR PUZZLES

(75) Inventor: Robert Andrew Wasmund, Toronto (CA)

(73) Assignee: 785291314, Inc., Toronto, Ontario (CA)

( * ) Notice: Subject to any disclaimer, the term of this patent is extended or adjusted under 35 U.S.C. 154(b) by 1209 days.

(21) Appl. No.: 13/426,591

(22) Filed: Mar. 21, 2012

(65) Prior Publication Data

US 2012/0178073 A1    Jul. 12, 2012

Related U.S. Application Data

(63) Continuation-in-part of application No. 12/285,212, filed on Sep. 30, 2008.

(60) Provisional application No. 60/960,532, filed on Oct. 3, 2007.

(51) Int. Cl.
*G09B 3/00* (2006.01)
*A63F 13/80* (2014.01)
*A63F 13/533* (2014.01)
*A63F 9/18* (2006.01)
*G09B 5/00* (2006.01)
*G09B 7/00* (2006.01)

(52) U.S. Cl.
CPC .............. *A63F 13/80* (2014.09); *A63F 9/18* (2013.01); *A63F 13/533* (2014.09); *A63F 2009/186* (2013.01); *A63F 2300/305* (2013.01); *A63F 2300/5533* (2013.01); *A63F 2300/8064* (2013.01); *G09B 3/00* (2013.01); *G09B 5/00* (2013.01); *G09B 7/00* (2013.01)

(58) Field of Classification Search
CPC ........ A63F 2300/8064; A63F 2009/186; A63F 9/18; G09B 3/06; G09B 7/06; G09B 3/00
USPC .................................................. 273/430
See application file for complete search history.

(56) References Cited

U.S. PATENT DOCUMENTS

| | | | |
|---|---|---|---|
| 6,318,722 B1 * | 11/2001 | Shafer | 273/272 |
| 2005/0196730 A1 * | 9/2005 | Kellman | G09B 7/00 434/118 |
| 2008/0054571 A1 * | 3/2008 | Davidzon et al. | 273/431 |

* cited by examiner

*Primary Examiner* — James S McClellan
*Assistant Examiner* — Syvila Weatherford

(57) ABSTRACT

A system that integrates at least two levels of quiz or puzzle solving. Some embodiments use a Graphical User Interface (GUI) aspect only. According to the GUI aspect, a gameplay sequence is provided, whereby an indication of a solution associated with a level-two quiz is displayed. A clue to a different, level-one quiz is subsequently presented. An attempt is input at the level-one quiz. A level-two quiz clue is displayed. The level-two quiz can be solved with one or more clues so provided. According to the data aspect, different quizzes or puzzles are data related through a persistent data structure. Embodiments that use a data aspect may omit displaying a solution indication.

3 Claims, 14 Drawing Sheets

```xml
<?xml version="1.0"?>                                                    ← 405
<qnq:twoLevelQuiz
 xmlns:qnq="http://www.quiznest.com/schema"
 xmlns:xsi="http://www.w3.org/2001/XMLSchema-instance"                   ⎬ 42-A
 xsi:schemaLocation="http://www.quiznest.com/schema qnq.xsd">

<qnq:levelTwoQuizSolution>happiness
    </qnq:levelTwoQuizSolution>                                          ⎬ 482

<qnq:levelOneQuiz>                                                   ← 46-A
        <qnq:levelTwoQuizClue>joy</qnq:levelTwoQuizClue>                 ← 462
        <qnq:category>Who said that?</qnq:category>                      ← 424
        <qnq:clue>Joy lies in ...</qnq:clue>                             ← 432
        <qnq:choice>                                                     ← 441-1
            <qnq:text>Vince Lombardi</qnq:text>                          ← 441-2
            <qnq:isCorrect>false</qnq:isCorrect>                         ← 441-3
        </qnq:choice>                                                    ← 441-4
        <qnq:choice>                                                     ← 442-1
            <qnq:text>Mahatma Ghandi</qnq:text>                          ← 442-2
            <qnq:isCorrect>true</qnq:isCorrect>                          ← 442-3
        </qnq:choice>                                                    ← 442-4
        ...                                                              ← 443
    </levelOneQuiz >                                                     ← 46-Z
    ...                                                                  ← 46'
</twoLevelQuiz >                                                         ← 42-Z
```

Fig. 4

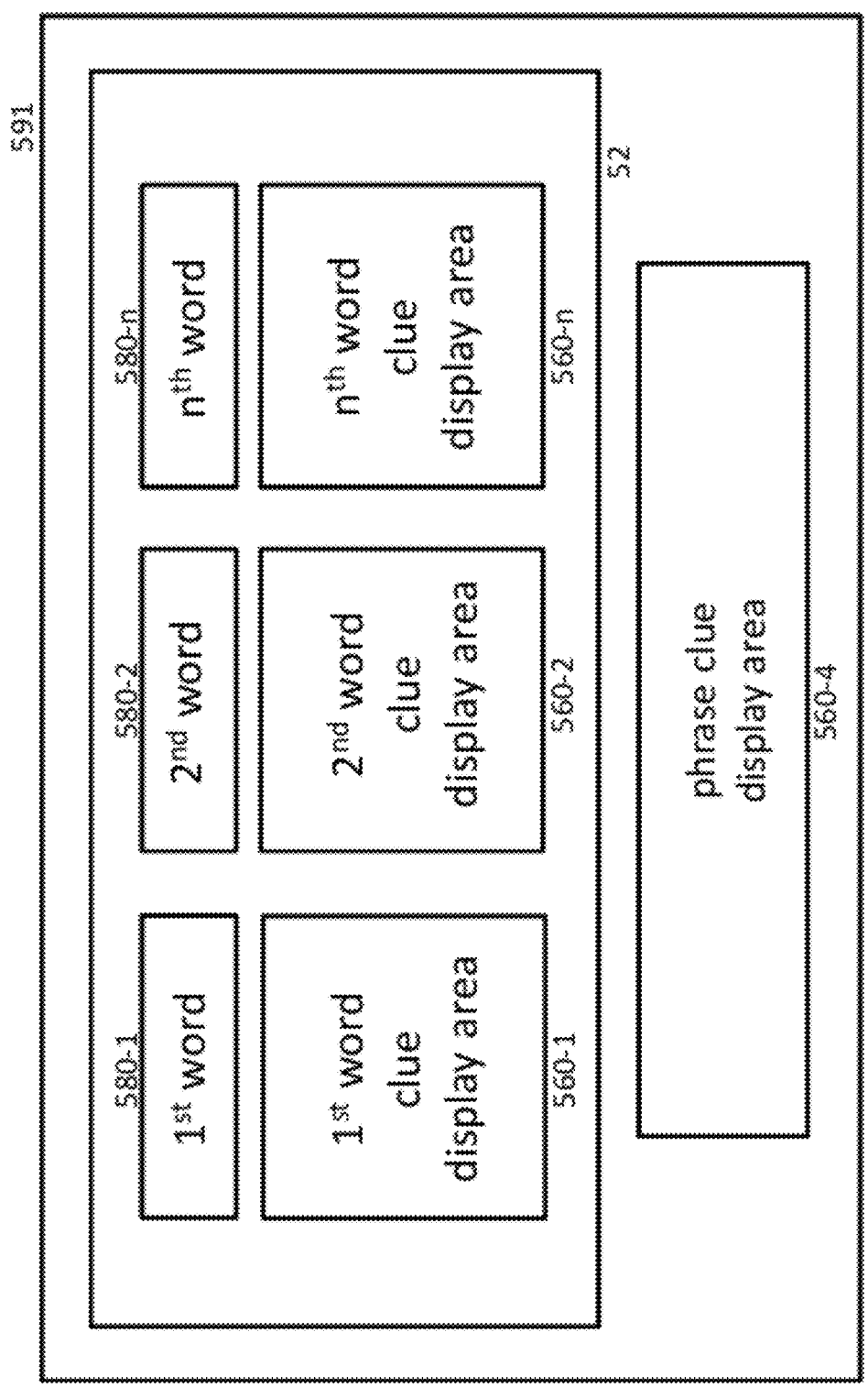

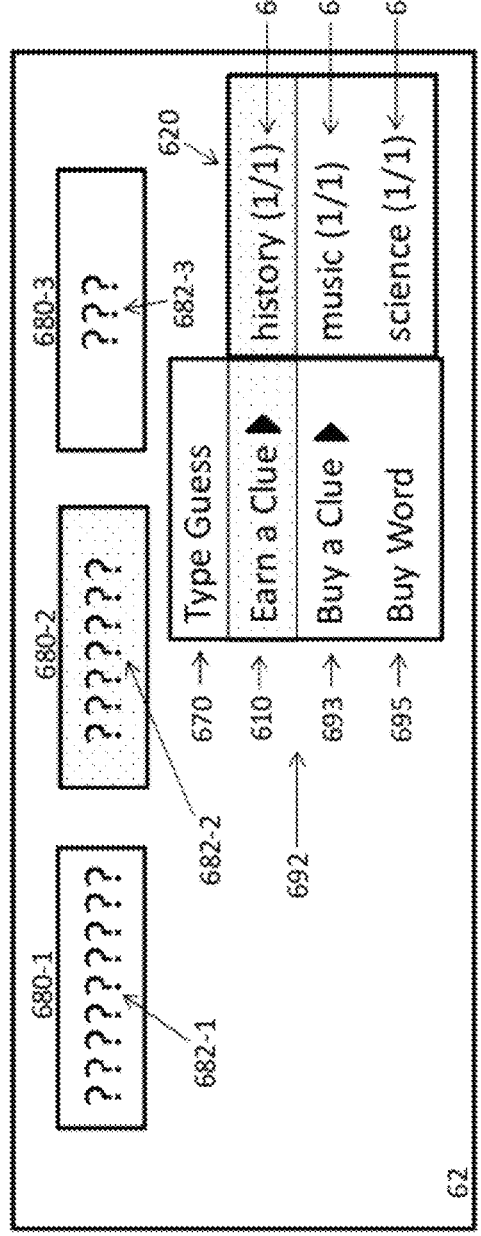
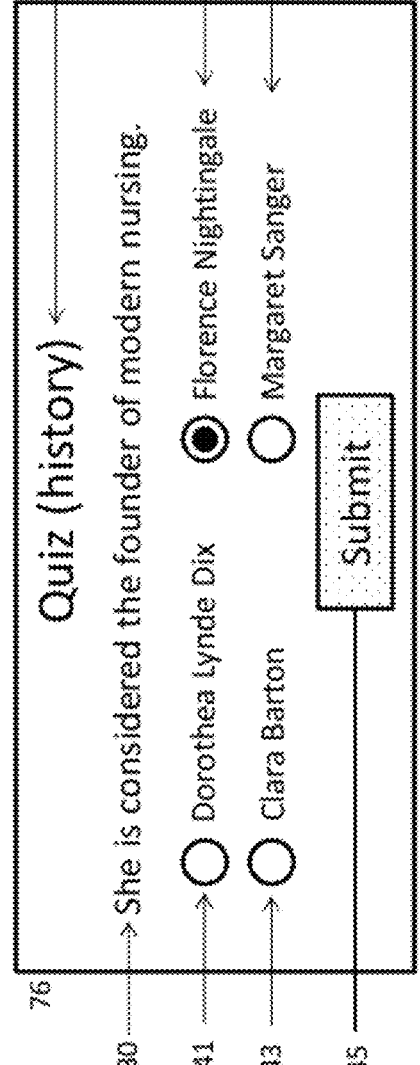

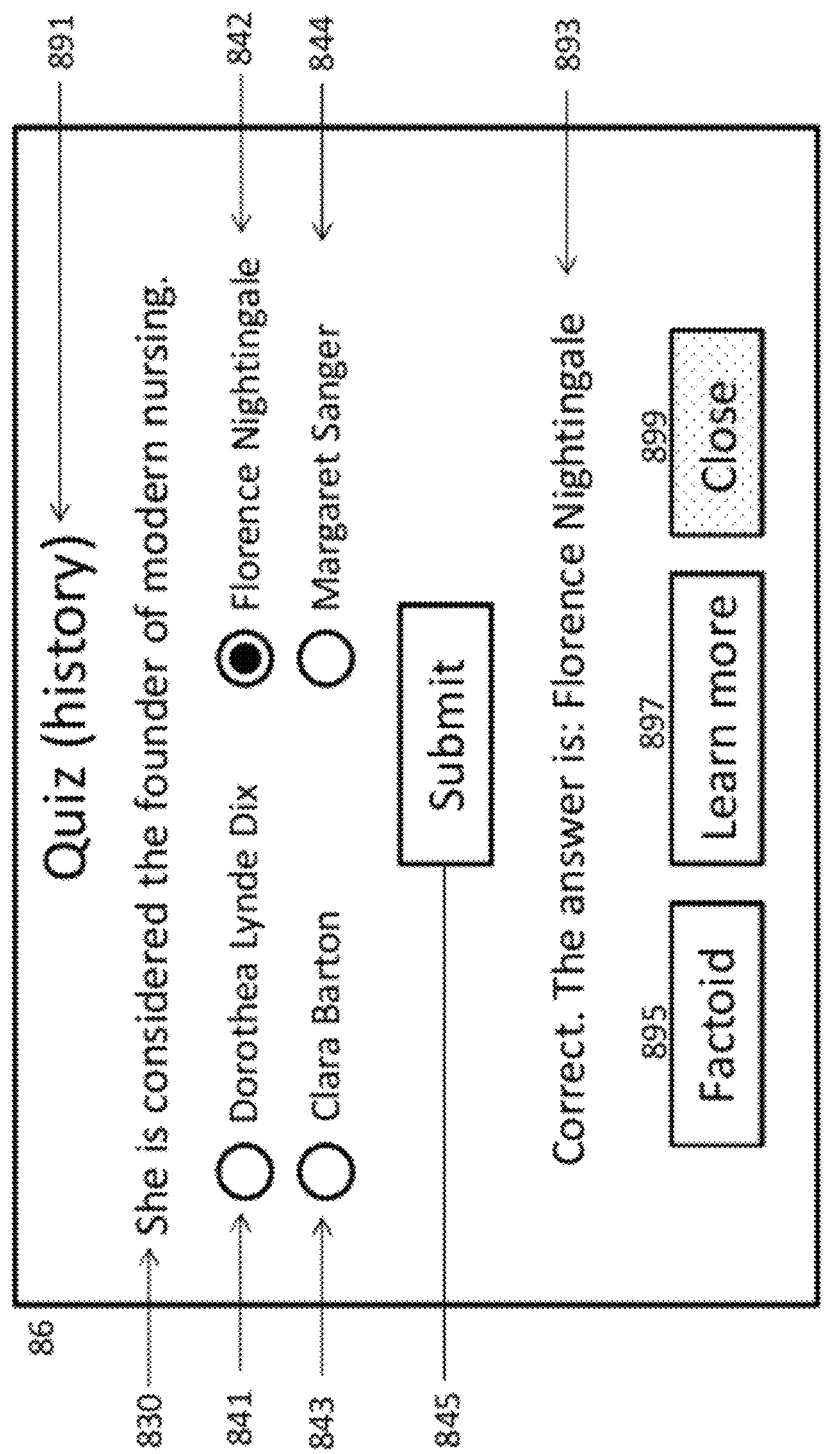

GAME SYSTEMS WITH INTEROPERATING OR BOTH INTEROPERATING AND INTERRELATED QUIZZES AND/OR PUZZLES

CROSS-REFERENCE TO RELATED APPLICATIONS

This nonprovisional application is a continuation-in-part of U.S. nonprovisional patent application Ser. No. 12/285,212, filed Sep. 30, 2008, which claims the benefit of U.S. provisional patent application Ser. No. 60/960,532, filed Oct. 3, 2007, both of which are incorporated by reference.

FEDERALLY SPONSORED RESEARCH

Not Applicable

SEQUENCE LISTING OR PROGRAM

This nonprovisional application incorporates-by-reference a computer program listing appendix.

BACKGROUND OF THE INVENTION

1. Field of Invention

This invention relates to word, quiz, and puzzle games. A new type of game system is presented for one or multiple players in a computer game, physical media, mixed media, or television game show format.

2. Description of Related Art

A discussion of the prior art of which the present inventor is aware, and its differences and distinctions from the present invention, is provided below.

The prior art includes many types of word, puzzle and quiz games that are both educational and recreational. Such games often use clues and clue-hiding mechanisms, and may allow for the progressive solution of a puzzle answer. 'Guess-the-phrase' puzzles are a popular format which can help to test and develop vocabulary.

Question-and-answer trivia is another popular genre used to develop general knowledge. It is not uncommon to use categories to organize quizzes for selection. There are also quest games with clue finding features, and games that offer a combination of quiz types. Many such games use a score-keeping mechanism, and are offered in single and multiple player modes. Many games are offered in computer format, can be played over the Internet, and use multimedia content.

The prior art contains examples of puzzles featuring progressively revealed clues. U.S. Pat. No. 6,318,722 to Shafer (2001) discloses a game wherein clues are revealed for sets of words in an ordered list. Shafer's invention utilizes clues and clue-hiding mechanisms. It also uses a score keeping mechanism. It also offers the solution of one puzzle after another with the assistance a game board.

U.S. Pat. No. 5,679,075 to Forrest, et al. (1997) discloses an interactive scavenger hunt combined with puzzle solving in the context of a narrative supplied by a prerecorded audio visual plot. Game participants solve puzzles or tricks in order to obtain clues that are used to help solve a "global meta-puzzle".

U.S. Pat. No. 5,221,094 to Hanson (1993) discloses a master puzzle concealed behind opaque cover up puzzle pieces. The pieces are removed on the basis of participants successfully answering trivia-quizzes displayed on accompanying cards.

Unlike the prior art, the present embodiments associate quizzes at two or more levels of problem solving through a GUI aspect described herein. Unlike the prior art, some embodiments connect a level-one quiz with a level-two quiz using a data aspect, described herein, whereby two quiz levels are connected using a data structure. The present embodiments can facilitate learning and enhance recreational enjoyment by uniquely interconnecting quizzes to sustain interest towards the solution of a second-level, and even higher level quizzes.

BRIEF SUMMARY OF THE INVENTION

Shown is a system that integrates at least two levels of quiz or puzzle solving (a puzzle is considered a quiz). Some embodiments use a Graphical User Interface (GUI) aspect only. Other embodiments, including the exemplary and practice embodiments described herein, include a data aspect and may have a modified GUI aspect.

The GUI aspect provides a novel gameplay sequence. An indication of a quiz solution visually associated with a certain quiz or puzzle, termed a 'level-two quiz', is displayed. The indication indicates but does not reveal the solution. A clue or question (a question is considered a clue) belonging to another quiz or puzzle, termed a 'level-one quiz', is subsequently presented. After a player attempts the level-one quiz, a clue comprised by the level-two quiz is displayed. A player attempts to solve the level-two quiz, and the attempt is validated. The level-two quiz is finished when the attempt is validated to be correct. In some embodiments, additional level-one quizzes, and iterations of obtaining a level-two quiz clue can be inserted into the gameplay sequence. Additional steps or contingencies can also be inserted into the gameplay sequence.

There are additional features of some embodiments that are optional according to other embodiments. Also, some design decisions are made in the present exemplary and practice embodiments that are not intended to limit other embodiments. In the present embodiments, a player activates the display of a level-one quiz clue while the level-two quiz indication is displayed. Also, level-one quizzes are selected from categories. Also, each level-one quiz comprises a solution, and a level-one quiz attempt is validated prior to the display of the level-two quiz clue in the gameplay sequence. In the exemplary embodiment, a score keeping means adjusts the score if the attempt is incorrect. In alternative embodiments, the current level-one quiz must be successfully solved in order for a level-two quiz clue to be provided.

There is also a data aspect according to some embodiments. In the exemplary and practice embodiments, the level-two quiz clue provided by the gameplay sequence is all or part of a data element displayed within the level-one quiz. In the exemplary embodiment, it is part of the level-one quiz question; in the practice embodiment, it is the level-one quiz solution. In alternative embodiments with a data aspect, the level-two quiz clue could be some other data element comprised by or related to the level-one quiz. This is accomplished by associating two quizzes at two levels using a data structure. Associating different quizzes or puzzles through a data structure is referred to as the 'data aspect'. Some embodiments that include the data aspect have a modified GUI aspect that does not require the level-two quiz solution to be indicated as explained.

In the exemplary and practice embodiments, each level-two quiz is a word puzzle to solve a hidden word or phrase. Trivia quizzes are shown as a level-one quiz or level-one quizzes. The practice embodiment also includes a word puzzle type of level-one quiz. Other types of quizzes, puzzles and problems could be used for the level-one and level-two quizzes.

BRIEF DESCRIPTION OF THE DRAWINGS

FIG. 4 pertains to the data aspect, showing how a level-one quiz and a level-two quiz can be data related using an exemplary XML document having the sample data shown in FIG. 3.

FIG. 5 shows a skeleton 'solve-the-phrase' interface for the practice embodiment, which includes multiple two-level quizzes and three quiz levels through interconnected two-level quizzes.

FIGS. 6-14 show a sample gameplay progression based on the skeleton GUI of FIG. 5.

FIG. 6 shows an in-progress solve-the-phrase puzzle, with all words initially masked according to an indication mode.

FIG. 7 shows a trivia quiz dialog accessed from the solve-the-phrase interface with a guess input and ready for validation.

FIG. 8 shows the trivia quiz dialog with its guess validated.

FIG. 9 shows the solve-the-phrase interface where a word clue has been obtained by taking the trivia quiz challenge of FIGS. 7 and 8, and where a quiz challenge to obtain a phrase clue is currently being selected.

FIG. 10 shows the solve-the-phrase interface with a new clue to the phrase in its unity.

FIG. 11 shows the solve-the-phrase interface with another word clue, where a player is currently opting to guess at a selected word.

FIG. 12 shows the solve-the-phrase interface with a word guess being input into a word area, which has gone from being in indication mode to being in entry mode.

FIG. 13 shows the solve-the-phrase interface with a word guess having been fully input into a word area, and where a subsequently displayed menu item is being selected in order to submit the typed guess for system validation.

FIG. 14 shows the solve-the-phrase interface at completion of play, with the phrase fully revealed.

DETAILED DESCRIPTION OF THE INVENTION

Scoring System

A variety of scoring systems are possible and not all embodiments require a scoring system. For the exemplary embodiment, a simple scoring system will accumulate a count of each incorrect level-one and level-two quiz guess. A lower score is preferred, with zero being perfect. A low score indicates proficiency with vocabulary and general knowledge and an aptitude for the game. Other embodiments will have different scoring systems and accommodate multiple players.

Graphical User Interface Aspect: Gameplay Sequence

Figure 1:
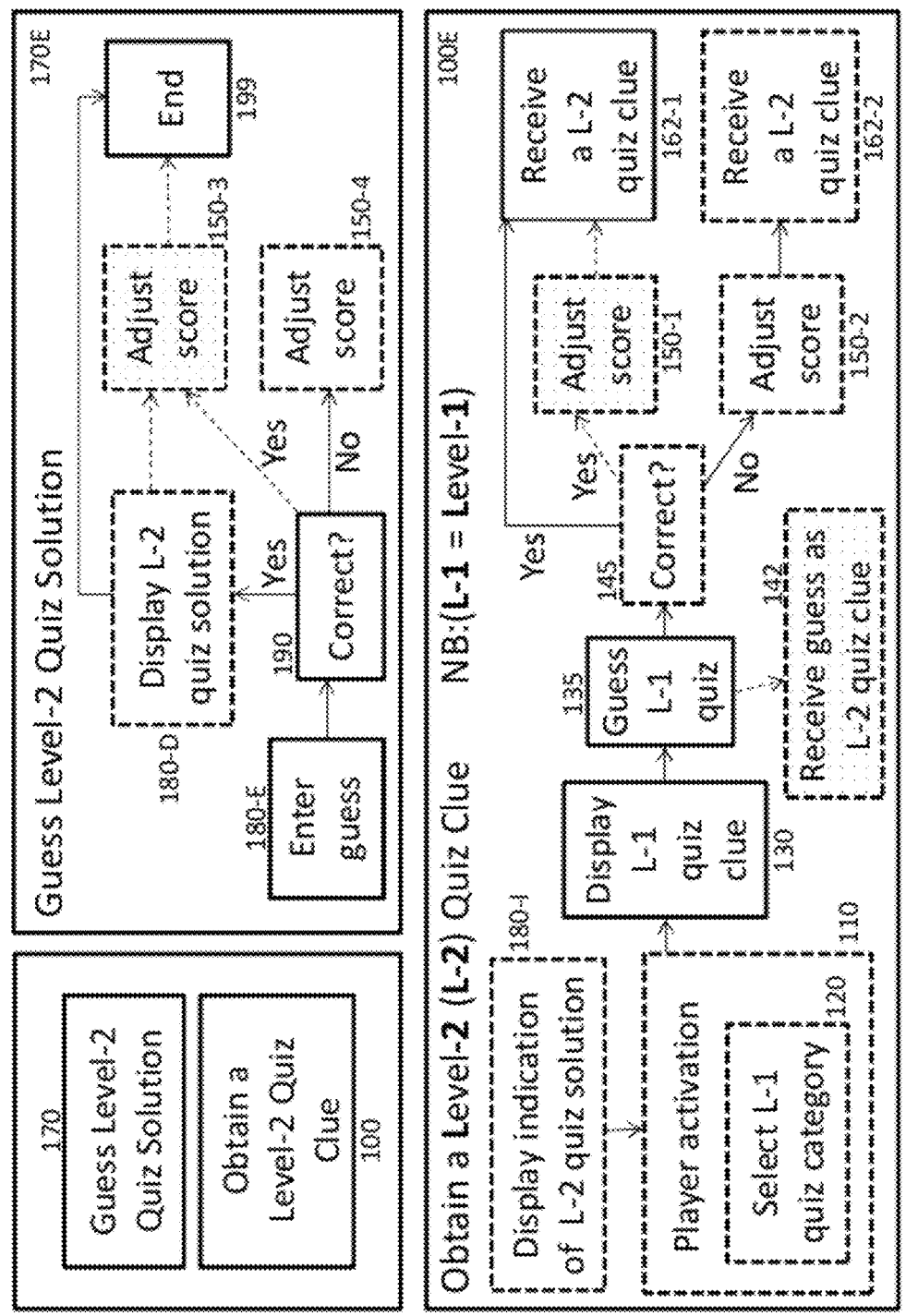
FIG. 1 shows the gameplay sequence for a puzzle with two quiz levels, a level-two quiz level and a level-one quiz level, showing the steps for guessing a level-two quiz solution and for obtaining a level-two quiz clue, which includes taking a level-one quiz.

Two main operations comprising a gameplay sequence are shown in FIG. 1. Steps in the GUI execution are shown with boxes. Steps that are optional according to some embodiments are drawn in a box bordered by a dashed line. Steps that are not implemented in the exemplary embodiment also have a shaded interior. Connecting arrows that pertain to some embodiments, but are not implemented in the exemplary embodiment are shown by a dashed connecting arrow.

There are two main operations, 'guess the level-two quiz solution', operation 170 and 'obtain a level-two quiz clue', operation 100. At least one clue comprised by the current level-two quiz is obtained via operation 100. Some embodiments have multiple level-one quizzes per level-two quiz. In such embodiments, multiple iterations of operation 100 can be performed until a player has enough clues to guess at the level-two quiz solution via operation 170. Generally, operation 100 can be repeated as long as level-one quizzes are available, or until the level-two quiz is solved. Operation 170 can generally be repeated until the level-two quiz is solved.

Expanded 'obtain a level-two quiz data element' operation 100E is explained. An indication of a level-two quiz solution is displayed in step 180-I. Step 180-I is required for embodiments lacking a data aspect. A player may 'select a level-one quiz category', step 120, which is optional according to some embodiments. Selecting a level-one quiz category is preceded by, or can be a type of player activation step 110, which is also optional according to some embodiments. Player activation means that a player activates the display of a clue or question to a level-one quiz. The display of a clue or question to a level-one quiz is step 130. A player can subsequently 'guess the level-one quiz' in step 135 by providing a guess to the current level-one quiz solution. The instant guess is validated in step 145 in the present embodiments. If the level-one guess is correct, score adjustment 150-1 changes the player's score in some alternative embodiments. However, under the exemplary scoring system, a low score indicates proficiency, so the score is not modified for a correct guess. If the guess is incorrect, score adjustment 150-2 adds a point to the player's score based on the exemplary scoring system described. When the level-one quiz guess is correct, a new level-two quiz clue is received in step 162-1. In the present embodiments, a new level-two quiz clue data element is received in step 162-2, even when the preceding level-one quiz guess was incorrect. A scoring system is used to penalize incorrect guessing. Some embodiments will withhold the level-two quiz clue if the preceding level-one quiz guess was incorrect.

Using expanded 'guess the level-two quiz solution' operation 170E, players may 'enter a guess', step 180-E at the level-two quiz solution. The level-two quiz solution guess is validated in step 190 for a given level-two quiz. In the present embodiments, the level-two quiz solution is displayed in step 180-D on correct validation. After that, the gameplay sequence ends 199 for a given two-level quiz. If gameplay was initiated from a menu of two-level quizzes, players may return to that menu (not shown) to select another quiz. In other embodiments, such as the practice embodiment, two-level quizzes are contained in a larger quiz structure, and play will continue on other parts of the structure until a top-most solution is found. In embodiments with an alternative scoring system, score adjustment 150-3 adjusts the score when the level-two quiz solution guess is correct. In the exemplary embodiment, score adjustment 150-4 adds a point when the level-two quiz solution guess is incorrect.

In an alternative embodiment, a level-one quiz guess that has not been validated could be provided in step 142 as a level-two quiz clue. Step 142 would then replace step 145 and on within operation 100E, terminating operation 100E.

Exemplary Embodiment: Graphical User Interface Aspect

Figure 2:
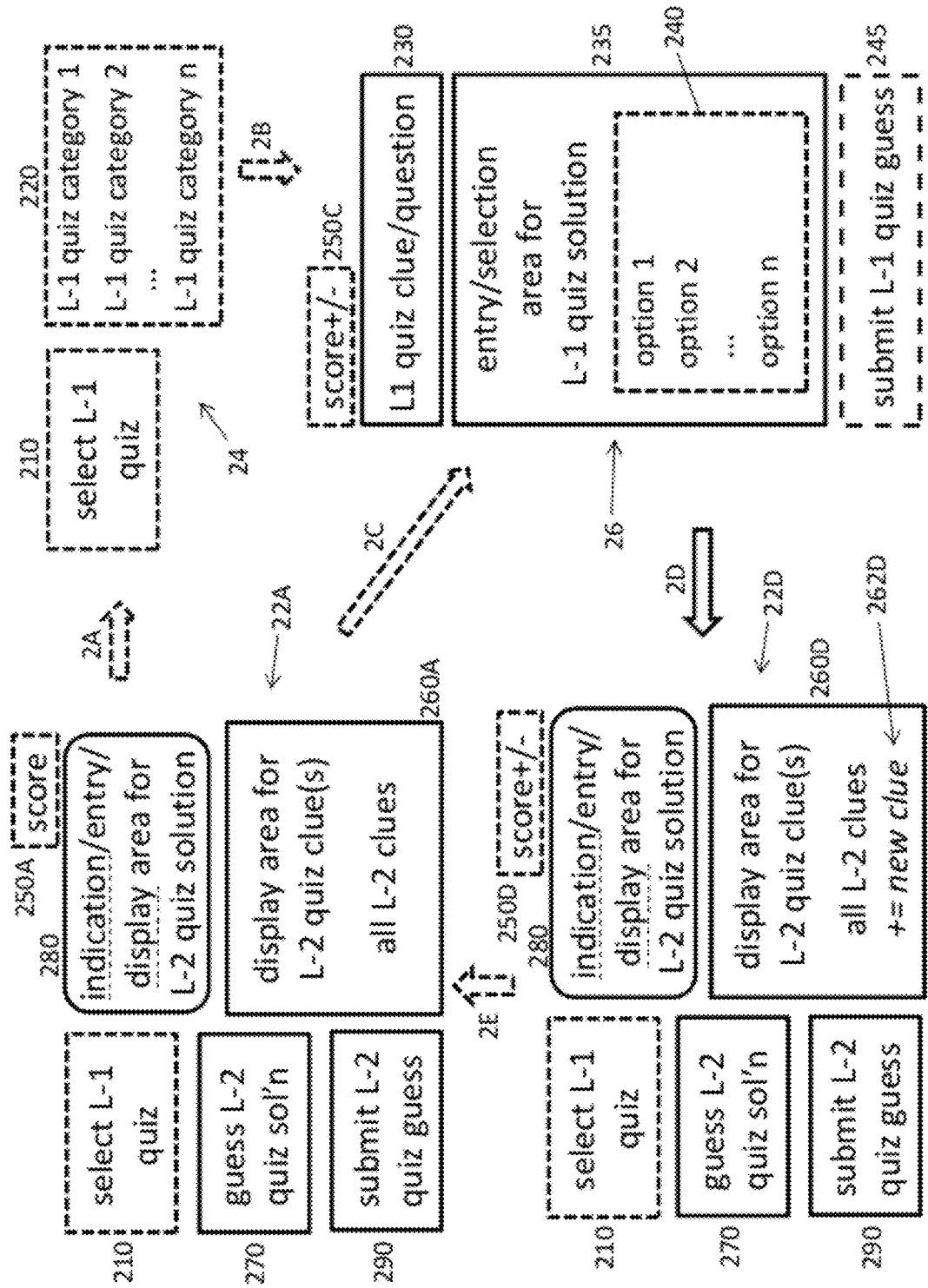
FIG. 2 shows an exemplary skeleton GUI of a puzzle with two quiz levels, summarizing the basic functionality embodied as; a 'solve-the-word' type of a level-two quiz interface; a level-one quiz selector mechanism; and, a trivia quiz type of a level-one quiz interface.

The exemplary GUI of FIG. 2 shows the main components of an exemplary embodiment, describing how they function during gameplay. The GUI with supporting hardware and software produces the gameplay sequence functionality. Different design decisions are possible, and all embodiments need not have all features of the exemplary embodiment. In particular, different quiz and puzzle types can be used. Components representing functionality that is optional according to some embodiments are bordered with a dashed line. A dashed underline is used to denote a mode that is optional according to some embodiments.

Level-two quiz interface 22A displays a level-two quiz, which can be part of a larger multi-level quiz, as in the practice embodiment. Interface 22A has an indication/entry/display area for representing a level-two quiz solution 280. In 'indication mode', area 280 visually indicates a solution corresponding to a level-two quiz, without revealing the level-two quiz solution. Indication mode is required in embodiments lacking a data aspect. In 'entry mode', area 280 provides an input location for inputting a guess at the level-two quiz solution using an entry or selection mechanism. In 'display mode', area 280 provides a location for displaying the solved level-two quiz solution. Display mode is optional according to some embodiments. Area 280 will appear in one of the available modes depending on the game state determined by progress and player input.

A display area for level-two quiz clues 260A displays clues to the level-two quiz solution, which are accumulated during gameplay. Area 260A is part of a level-two quiz clue display means. Players can use 'select level-one quiz' mechanism 210, exemplified as a button and optional according to some embodiments. Mechanism 210 is part of an activating means for enabling a player to activate the display of a new level-one quiz clue within the gameplay sequence. Players also have 'initiate a guess at level-two quiz solution' mechanism 270, exemplified as a button. There is also a 'submit level-two quiz guess' mechanism 290, exemplified as a button. There is also a cumulative score display area 250A, which is optional according to some embodiments. Area 250A is part of a score keeping means.

According to some embodiments, gameplay follows path 2A. Quiz selector mechanism 24 comprises 'select level-one quiz' mechanism 210. When a player uses mechanism 210, the system displays a level-one quiz categorization mechanism 220, exemplified as a menu of categories organizing level-one quizzes for selection. Players next select a category from mechanism 220, causing level-one quiz interface 26 to appear. Mechanism 24 is part of a level-one quiz category display means. Mechanism 220 is part of a level-one quiz category selection means, and a category-and-quiz integration means.

Interface 26 may be arrived at from mechanism 24, as shown by path 2B. In embodiments not using mechanism 24, interface 26 could appear by some other path 2C. Some path between interfaces 22A and 26, shown as the combination of paths 2A and 2B, or else path 2C, is necessarily followed in embodiments that lack a data aspect.

Level-one quiz clue or question area 230 displays text and/or it can display or represent one or more multimedia components holding one or more questions or clues to the current level-one quiz. Area 230, with supporting hardware and software, is part of a level-one quiz clue display means for revealing at least one clue (or question) comprised by a level-one quiz. Players can input a corresponding guess in an entry (or selection) area for the level-one quiz solution 235. Area 235 contains or represents a multiple choice panel 240 in the exemplary embodiment, but could contain or represent a text entry area, or some other mechanism for inputting a quiz guess. Area 235 is part of a level-one quiz attempt input means. A 'submit level-one quiz guess' mechanism 245 is exemplified as a button. It is used by players to submit a level-one quiz guess for validation, and is optional according to some embodiments. Mechanism 245 is part of a level-one quiz validation means. In the exemplary embodiment, the system validates each level-one quiz guess. There can also be a cumulative score display area 250C for interface 26, which is optional according to some embodiments. Area 250C is part of a score keeping means.

Following completion of a level-one quiz, focus moves to level-two quiz interface 22D, following path 2D. A new clue 262D is displayed within display area for level-two quiz clues 260D. Area 280 is in indication mode, and the score is displayed in cumulative score display area 250D.

From interface 22D (or 22A), players can use 'initiate a guess at level-two quiz solution' mechanism 270, exemplified as a button. The choice of mechanism 270 puts area 280 into entry mode. In entry mode, an entry or selection mechanism allows input of a guess in area 280. The practice embodiment describes additional text entry details that could apply to the exemplary embodiment. Once a player has typed or selected their guess to the level-two quiz solution within area 280, 'submit the level-two quiz guess' mechanism 290 can be used to submit the guess for validation. Together, mechanism 270 and area 280 in entry or selection mode are part of a level-two quiz attempt input means. Together, mechanism 270, area 280 in entry or selection mode, and mechanism 290 are part of a level-two quiz solving means that also includes a level-two quiz validation means. If the level-two quiz guess is validated to be correct, area 280 displays the level-two quiz solution in display mode, and area 250D is updated if the score has changed. In the present embodiments, correct validation of the level-two quiz solution fixes area 280 in display mode and disables further use of mechanisms 210, 270, and 290 for a given level-two quiz. Prior to that, in embodiments which have multiple level-one quizzes per level-two quiz, players can iteratively solve additional level-one quizzes to obtain additional clues for the level-two quiz via iteration path 2E.

Figure 3:
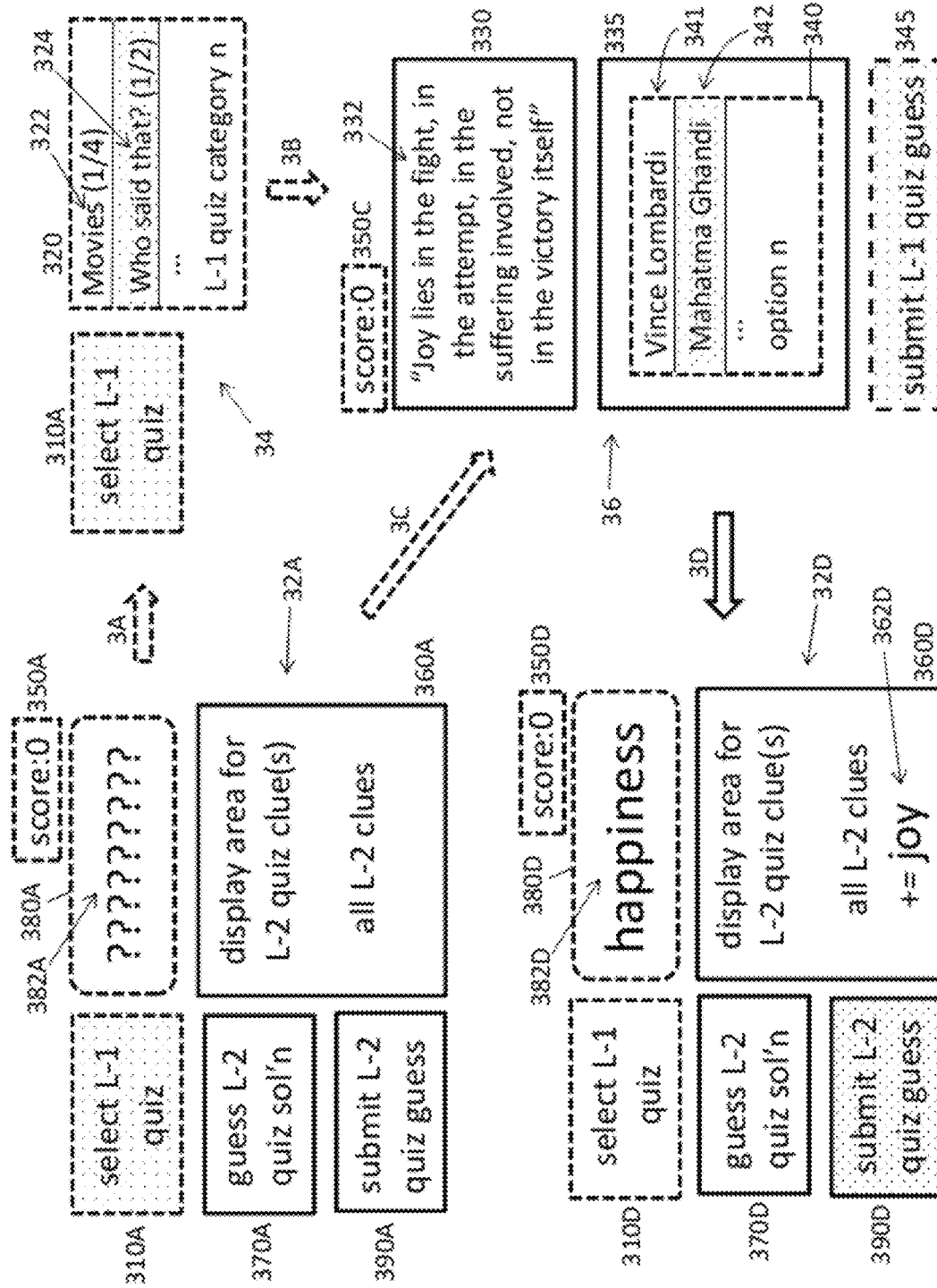
FIG. 3 follows the exemplary skeleton GUI of FIG. 2, showing sample quiz data, progression and outcome, with a level-one trivia quiz and an exemplary solve-the-word level-two quiz.

FIG. 3 repeats the skeleton exemplary embodiment of FIG. 2, showing sample data and a sample outcome based on assumed player input. A shaded interior indicates a component that has been recently selected in the sample iteration. Area 380A, in indication mode, shows a hidden word indication 382A. Indication 382A is part of an indicating means for displaying an indication of a quiz or puzzle solution. Indication 382A is displayed with a masking character "?" in place of each letter of the level-two quiz solution.

It is assumed that a player uses 'select level-one quiz' mechanism 310A of quiz selector mechanism 34 to display categorization mechanism 320, with sample categories 322 "Movies" and 324 "Who said that?" via path 3A. As an extra feature, the number of the next level-one quiz, out of the number of available level-one quizzes is shown for each number of available level-one quizzes is shown for each category, for example, "(½)" for category 324. The number of available level-one quizzes displayed is a count of level-one quizzes, in the instant category, that are made available from a given level-two quiz. This number is derived from supporting quiz data. The number of the next level-one quiz is incremented by one after a quiz has been selected in the instant category, and the system only allows the same level-one quiz to be completed once per level-two quiz.

Assuming a player selects category 324, level-one quiz interface 36 is displayed. Level-one quiz clue or question area 330 shows level-one quiz clue 332, a famous quotation, via path 3B. Level-one quiz solution area 335 comprises or represents multiple choice panel 340. Panel 340 shows exemplary (incorrect) multiple choice option 341 and (correct) multiple choice option 342. It is assumed that a player selects (correct) option 342 as their guess. The guess is then submitted with 'submit level-one quiz guess' mechanism 345 for validation. Based on the exemplary scoring system, a point would be added to area 350C if the guess at the level-one quiz were incorrect.

Once the level-one quiz is completed, with any validation performed, interface 36 is closed or made inactive. Focus moves to level-two quiz interface 32D via path 3D. Cumulative score display area 350D will show the latest score. Also, display area for level-two quiz clues 360D displays new level-two quiz clue 362D.

Interface 32D further shows the result of a progression whereby a player has solved the level-two quiz. Using mechanism 370D, a player has caused area 380D to change from indication mode (as shown by 380A) to entry mode (not shown). This enabled text input of the hidden word in area 380D (not shown). It is assumed that a guess ("happiness") for the level-two quiz was input (not shown). It is assumed that the guess was then submitted for validation with mechanism 390D (not shown). It is assumed that the guess was then validated to be correct (not shown). On or following validation that the guess was correct, area 380D changes to display mode. In display mode, level-two quiz solution 382D displays, as shown. In the example, a zero score displays in area 350D. This score assumes that there were no incorrect guesses throughout the two quiz levels. Gameplay has effectively ended for the current level-two quiz, along with any further level-one quizzes that pertain to it. If the level-two quiz guess had been validated to be incorrect, gameplay would continue (not shown), and a point would have been added in area 350D (not shown).

Also shown in FIG. 3 are 'initiate a guess at level-two quiz solution' mechanism 370A, 'submit level-two quiz guess' mechanism 390A, display area for level-two quiz clues 360A, cumulative score display area 350A, 'select level-one quiz' mechanism 310D, and some other path 3C. Some path between interfaces 32A and 36, shown as 3A and 3B, or else 3C, is necessarily followed for embodiments lacking a data aspect.

Exemplary Embodiment: Data Aspect

In the example of FIG. 3, level-two quiz clue 362D bears a relationship to level-two quiz solution 382D ("joy" is a synonym for "happiness"). Clue 362D also bears a relationship to the level-one quiz, in the instant case to level-one quiz clue 332. The text for level-two quiz clue 362D, "joy" is contained within the level-one quiz clue 332 quotation. Associating a data element of a level-one quiz with a level-two quiz clue is accomplished with a data aspect which is not necessary to all embodiments.

The data aspect relates a level-one quiz data element with a level-two quiz clue. A level-one quiz data element could be all or part of the level-one quiz solution, clue or question, or some post-answer information, and could be text, a picture, a video clip, or an audio clip. More generally, a data structure comprising at least one such relationship between a level-one quiz and a level-two quiz is referred to as a 'quiz tree'. A quiz tree is displayed by a graphical user interface to present one iteration of the game. In the present embodiments, quiz trees are created in the Extensible Markup Language (XML), and there is one XML file per quiz tree. An XML nesting structure allows one quiz to be related to another quiz.

An XML schema describes the structure of each XML document which a corresponding computer program can accept for gameplay. The schema is defined using the XML Schema Definition (XSD). An exemplary, text-only schema is shown below.

```
<?xml version="1.0" encoding="UTF-8"?>
<xs:schema xmlns:qnq="http://www.quiznest.com/schema"
xmlns:xs="http://www.w3.org/2001/XMLSchema"
xmlns="http://www.quiznest.com/schema"
targetNamespace=
"http://www.quiznest.com/schema" elementFormDefault="qualified">
<xs:element name="twoLevelQuiz">
<xs:complexType>
<xs:sequence>
<xs:element name="levelTwoQuizSolution" type="xs:string"
maxOccurs="1" minOccurs="1"/>
<xs:element name=" levelOneQuiz" type="qnq:LevelOneQuizType"
maxOccurs="unbounded" minOccurs="1"/>
</xs:sequence>
</xs:complexType>
</xs:element>
<xs:complexType name = "LevelOneQuizType">
<xs:sequence>
<xs:element name="levelTwoQuizClue" type ="xs:string"/>
<xs:element name="category" type ="xs:string"/>
<xs:element name="clue" type ="xs:string"/>
<xs:element name="choice" type="qnq:ChoiceType" maxOccurs=
"unbounded" minOccurs="2"/>
</xs:sequence>
</xs:complexType>
<xs:complexType name = "ChoiceType">
<xs:sequence>
<xs:element name="text" type="xs:string" maxOccurs="1" minOccurs=
"1"/>
<xs:element name="isCorrect" type="xs:boolean" maxOccurs=
"1" minOccurs="0" default="false"/>
</xs:sequence>
</xs:complexType>
</xs:schema>
```

A partial, exemplary XML quiz tree conforming to this schema is shown in FIG. 4 which begins with declaration 405. Root element 42 defines a 'two-level quiz' element. Element 42 begins with start tag 42-A, and ends with end tag 42-Z. It encloses 'level-two quiz solution' element 482. Element 482 holds the level-two quiz solution ("happiness") shown in FIG. 3 as solution 382D. The exemplary GUI also uses the text length of the word enclosed by element 482 to provide the number of masking characters shown in indication 382A. Element 42 also encloses a level-one quiz element 46. Element 46 begins at start tag 46-A, and ends with end tag 46-Z. It defines a single level-one quiz element. Also, element 46 nests 'level-two quiz clue' element 462.

Element 462 holds the text comprised by level-two quiz clue 362D ("joy"). Element 46 also nests first-level quiz category element 424, which holds the text for category 324 ("Who said that?"). Element 424 and its corresponding definition is an optional part of the data aspect according to some embodiments. Element 46 also nests level-one quiz clue 432 ("Joy lies in . . . ") shown as clue 332. Element 46 also nests multiple choice elements exemplified as 441, 442, and any additional multiple choice elements 443.

Multiple choice element 441 includes start tag 441-1 and end tag 441-4. It also includes text element 441-2, holding text "Vince Lombardi", shown as (incorrect) multiple choice option 341. Element 441 also holds 'true or false' element 441-3, which the GUI uses to determine if the given multiple choice element is the solution to the level-one quiz. In this case, element 441-3 contains a boolean "false" value. Multiple choice element 442 similarly includes start tag 442-1 and end tag 442-4. It includes text element 442-2 holding "Mahatma Ghandi", shown as (correct) multiple choice option 342. True or false element 442-3 contains a boolean "true" value. One or more additional level-one quizzes 46' may be included in the quiz tree, according to embodiments with multiple level-one quizzes per level-two quiz.

Element 482 is termed a persistently stored level-two quiz solution, and; element 462 is a persistently stored level-two quiz clue. Elements 482 and 462 are comprised by a persistently stored level-two quiz. Element 442-2 is a persistently stored level-one quiz solution, and; element 432 is a persistently stored level-one quiz clue. Elements 442-2 and 432 are comprised by a persistently stored level-one quiz. The nesting of element 462 within element 46 defines a persistently stored relationship between a persistently stored level-two quiz clue and a persistently stored level-one quiz.

Element 424 is a persistently stored level-one quiz category. The nesting of element 424 within element 46 defines a persistently stored category relationship between a level-one quiz and a level-one quiz category.

Embodiments that include a data aspect do not necessarily include an indicating means, or display an indication of a level-two quiz solution, as shown in step 180-I in FIG. 1. Also, in FIG. 2, area 280 need not have an indication mode, and the gameplay sequence need not begin with interface 22A.

Practice Embodiment

The computer instructions included with this specification describe a practice prototype embodiment created in the Java programming language using object oriented design. Other design decisions could have been made to create alternative embodiments. The prototype includes additional features. For example, it contains multiple two-level quizzes, whereby a phrase can have multiple words each representing a level-two quiz solution. The phrase in its unity can also represent another level-two quiz solution. Clues can be earned for each level-two quiz by taking trivia quizzes to earn level-two quiz clues, which are graphically coordinated with the words to which they apply, or to the phrase in its unity. There is also another quiz level wherein the phrase can be solved from its constituent words, which themselves become clues to the phrase when they are solved. 'Quiz words' are distinguished from regular words which do not have trivia quizzes associated to them, but which can be either solved, or 'bought' with a 'buy word' feature. There are also 'hints', which simply yield a hint to a word (or the phrase in its unity) without a trivia quiz. The hints and buy word features are intended to add a score point when used in the practice embodiment, based on the exemplary scoring system. They are also categorized under each quiz word (or the phrase in its unity) in the same manner as the level-one (trivia quiz) quizzes. 'Factoids' and 'references' provide other features not included in the exemplary embodiment. "Factoids" display some supplementary information after a quiz challenge. URL references link to further information or promotions. A score keeping means, references, support for files, and continuous typing of multiple words of a phrase guess are not fully implemented in the practice embodiment. Other embodiments would emphasize the use of multimedia for clues, solutions, choices, and other data elements, and multi-player features.

Practice Embodiment: Graphical User Interface: Sample Iteration

FIG. 5 shows a skeleton 'solve-the-phrase' interface 591. Grid 52 contains an array of level-two quizzes that are each similar to the level-two quiz of the exemplary embodiment. An array of indication/entry/display areas for a level-two quiz solution, or word areas, is drawn on the screen. First word area 580-1 for a first word, second word area 580-2 for a second word, and n-th word area 580-n for an "nth" word, representing the last word of a hypothetical phrase, are shown. Grid 52 also contains an array of clue display areas for holding level-two quiz clues. A first word clue area 560-1, second clue area 560-2, and n-th word clue area 560-n for the final word are shown. For words that are not quiz words, the area below the word does not display clues (not shown). The border of each word clue area need not be drawn in the interface, and each word clue area is positioned beneath the word area that its clues pertain to. The word clue areas and word areas may be adjusted by the system to make the best use of screen real estate, so long as each word clue remains visually correlated with the (quiz) word that it pertains to. A phrase clue area 560-4, for displaying clues to the phrase in its unity, is positioned beneath grid 52. As shown, the user interface demarcates each word area by a rectangular border and a separation between words.

The goal is to identify the entire phrase. To do this, players identify individual words by obtaining clues that are themselves obtained by solving, or attempting, quiz-challenges. In FIG. 6, grid 62 contains a first word area in indication mode 680-1, a second word area in indication mode 680-2, and a third word area in indication mode 680-3 for the first, second and third words respectively of a sample three word phrase. First word indication 682-1, second word indication 682-2, and third word indication 682-3 each display a masking character for each letter of a word solution. In the current example, all words are 'quiz words', but this need not be the case. When a player hovers over one of word areas 680-1, 680-2, or 680-3 with a mouse or other pointing device, that word becomes 'active'. Its interior changes color to represent that that an action can be taken on the word. It is assumed that a player has hovered over area 680-2, which is shown to be active by shading. If a player then selects one of word areas 680-1, 680-2, or 680-3 with a mouse or other pointing device, a menu will display. Assuming that a player selects word area 680-2, menu 692 displays. Menu 692 includes menu item 670 for initiating a guess at the selected word, menu item 610 for earning a clue to the selected word, menu item 693 which allows a player to expend points in order to buy a clue to the selected word, and menu item 695 for buying the selected word. Menu items 693 and 695 are not detailed further. Assuming a player selects menu item 610, shown to be active by shading, fly out menu 620 presents categories from which a trivia quiz can be selected that will allow a player to earn a clue. Categories 622, 624, and 626 are shown, each with the number of the current quiz, over the total number of quizzes available in that category, for the selected word. Assuming a player then selects "history" category 622, a trivia quiz challenge is presented as shown in FIG. 7.

Each quiz-challenge is displayed within trivia quiz dialog 76, a type of level-one quiz interface. It displays a trivia clue or question 730 (a question is considered a "clue"). Incorrect multiple-choice responses 741, 743, and 744, and correct multiple choice response 742 are also shown. Label 791 reiterates the category of the current trivia quiz. Shown is a trivia quiz challenge in the form of a text-based question. Other embodiments will incorporate a picture, video, or audio clip. A submit button 745 allows a player to submit a selected choice. In the example, it is assumed that the player has selected correct response 742 "Florence Nightingale", and button 745 is then selected with a pointing device, as indicated by shading.

FIG. 8 shows the trivia quiz dialog in a progression where a player has selected the correct choice to the trivia quiz of FIG. 7, and the guess has been system validated. Trivia quiz dialog 86, trivia clue or question 830, and label 891 are shown. Multiple-choice responses 841, 842, 843, and 844, and submit button 845 are all disabled and not subject to further player input. Validation message 893 informs whether response 742 was correct. Factoid button 895 can be selected to display one or more additional pieces of information related to the current trivia quiz. Button 895 is not detailed further. 'Learn more' button 897 will direct a player to one or more Internet resources for additional information about the current trivia quiz. Button 897 is not fully implemented and is not detailed further. Close button 899 closes the current trivia quiz dialog, and makes the solve-the phrase display the active display once more.

Figure 9:
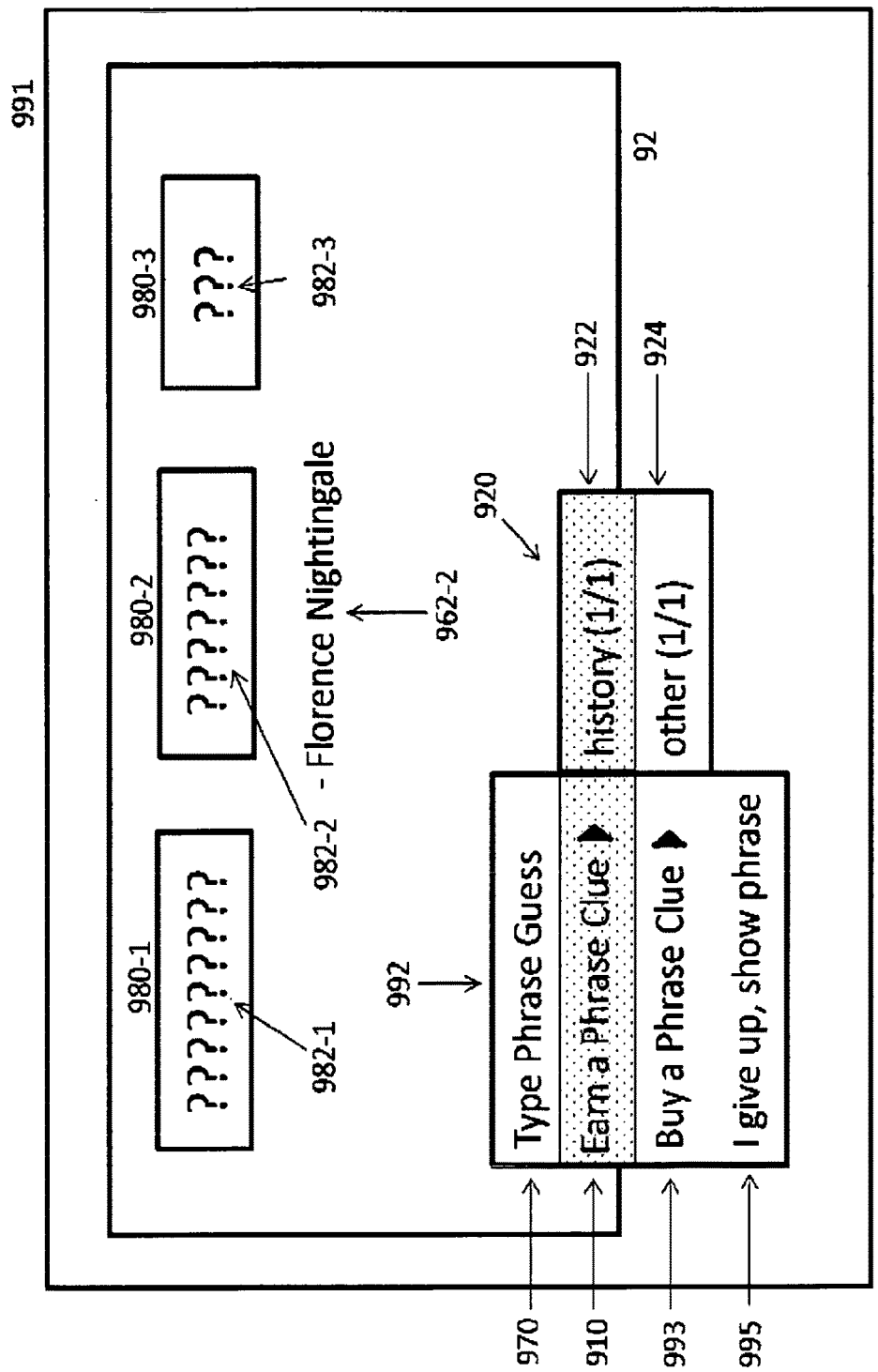

FIG. 9 shows 'solve-the-phrase' display 991. Clue 962-2, which is the solution of the trivia quiz of FIGS. 7 and 8 and the text of correct response 742, is shown below word area 980-2 (within a clue area, not shown). Players can select from several categories of quiz challenge for each quiz word in the phrase. In another aspect of the practice embodiment, clues to the phrase as a whole can be obtained by solving quiz-challenges associated to the phrase in its unity. Following the display of new clue 962-2, it is assumed that a player has selected within the border of grid 92, but outside of word areas 980-1, 980-2, and 980-3. This will display menu 992, which includes menu item 970 for initiating a guess at the phrase in its unity, menu item 910 for earning a clue to the phrase in its unity, menu item 993 for buying a clue to the phrase in its unity, and menu item 995 for giving up and showing the phrase solution. Menu items 970 and 995 are not fully implemented and are not further detailed. Assuming a player has selected menu item 910, as shown by shading, fly out menu 920 presents categories from which a trivia quiz can be selected. Each trivia quiz will allow a player to earn a clue. Categories 922 and 924 are shown, each with the number of the current quiz, over the total number of quizzes available in that category, for the phrase. First through third word indications 982-1, 982-2, and 982-3 are also shown.

Figure 10:
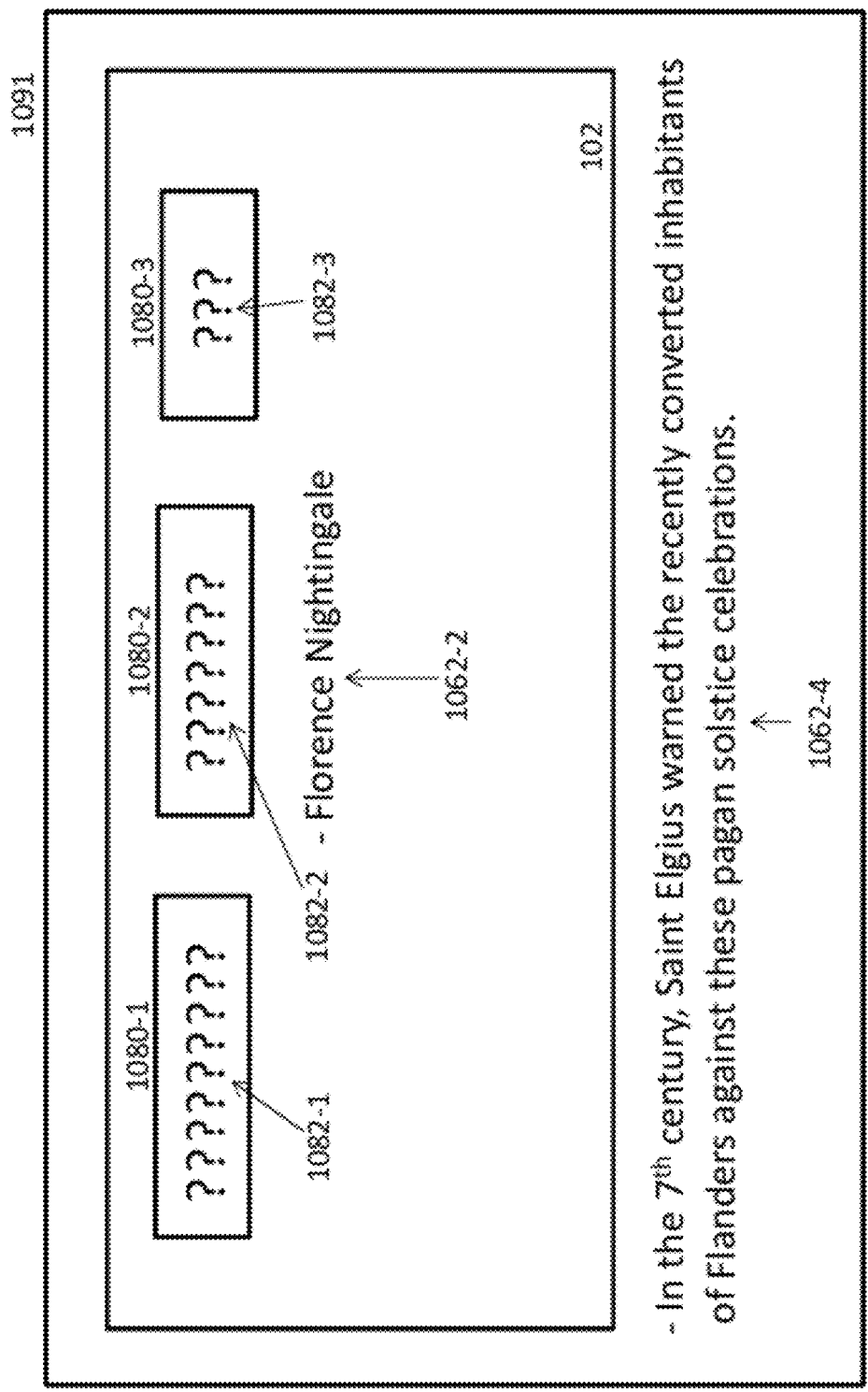

FIG. 10 shows the game after further progression. A new clue 1062-4 has been displayed following the completion of a trivia quiz (not shown). Also shown are first through third word areas 1080-1, 1080-2, and 1080-3, first through third word indications 1082-1, 1082-2, 1082-3, clue 1062-2, grid 102 and display 1091.

Figure 11:
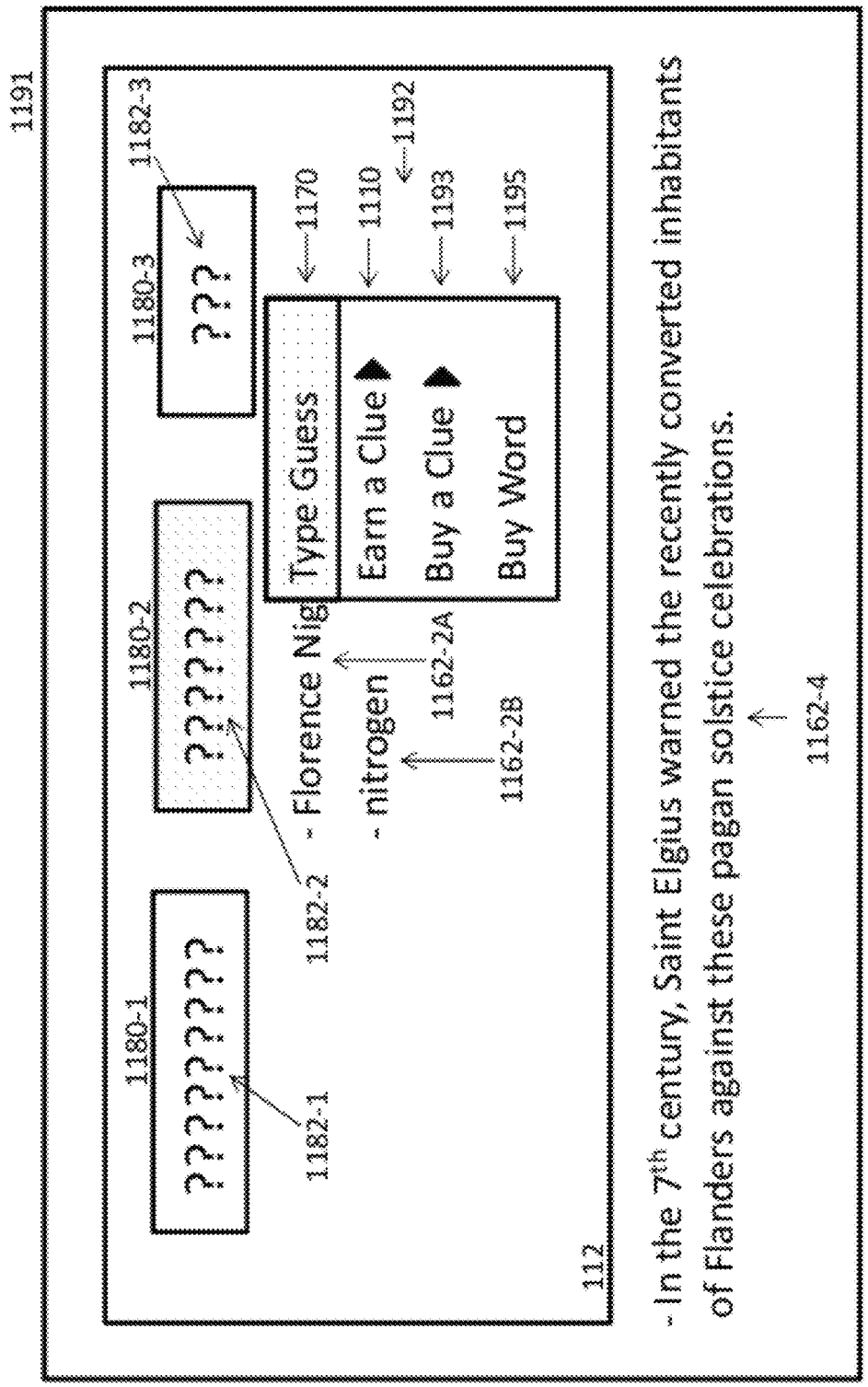

FIG. 11 shows the game after continued play (not shown). Clue 1162-2A (partially covered by menu 1192), and a more recently obtained clue 1162-2B both correspond to the solution represented by indication 1182-2 within second word area 1180-2. It is assumed that a player has selected area 1180-2, causing menu 1192 to display. Menu 1192 includes menu item 1170 for initiating a guess at the selected word, submenu 1110 for earning a clue to the selected word, submenu 1193 for buying a clue to the selected word, and menu item 1195 for buying the selected word. Also shows are first and third word areas 1180-1 and 1180-3, first and third word indications 1182-1 and 1182-3, clue 1162-4, grid 112 and display 1191. It is assumed the player next selects menu item 1170.

Figure 12:
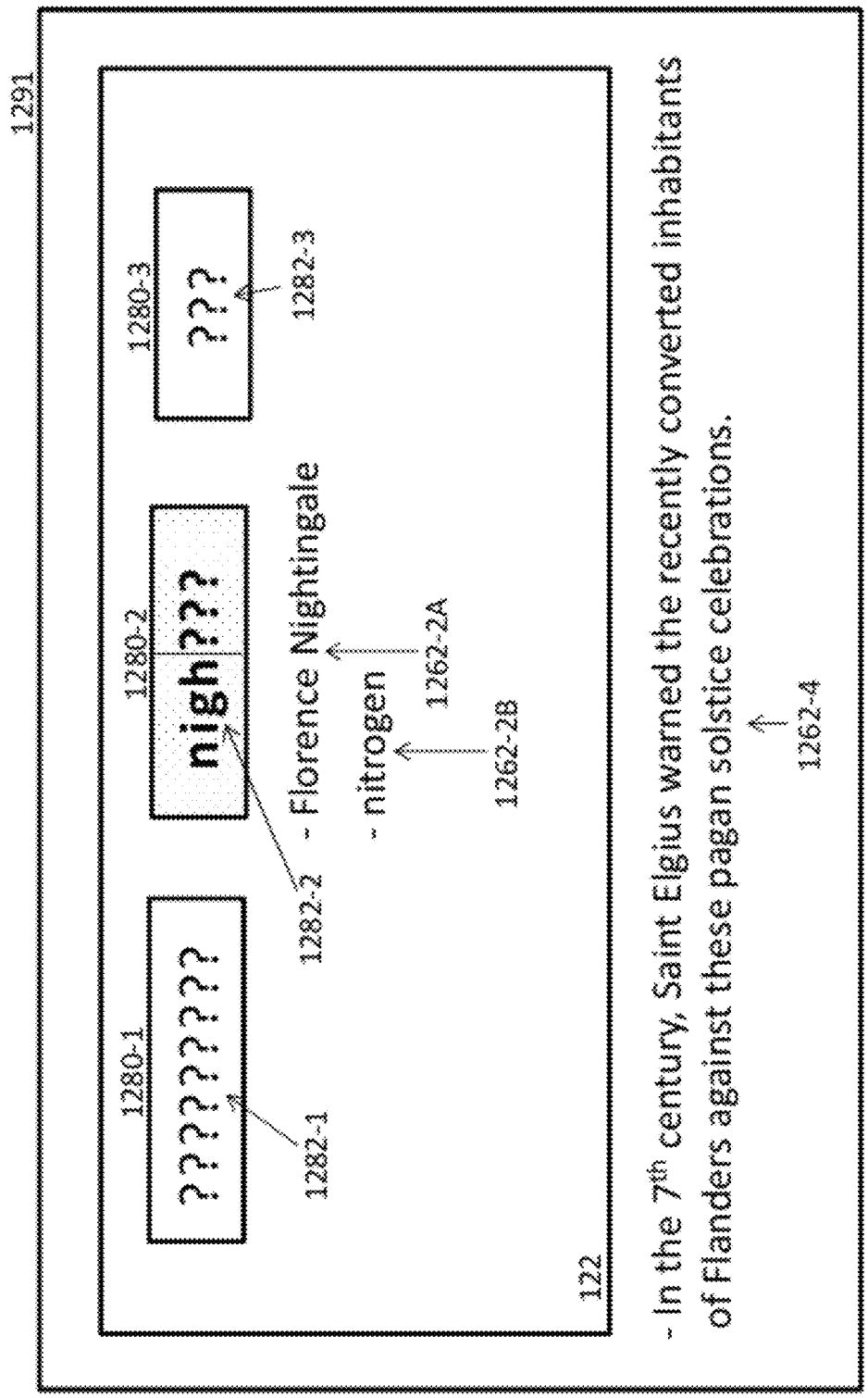

FIG. 12 shows the game after further play. Second word area 1280-2 has switched from indication mode to entry mode. Entry mode initiates with a visible text input cursor in front of the first masking character within the selected word area (not shown), and text input is enabled. As each character of the level-two quiz guess is typed, a masking character is replaced with a typed character and the text input cursor moves forward one character until all masking characters are replaced by typed characters. Editing of the guess prior to submission is also allowed and players can move the text input cursor forward or backward. Second word 'partial indication' 1282-2 is shown with part of its previous indication mask, which is in the process of being overwritten with a word guess based on player input. Clues 1262-2A, 1262-2B, 1262-4, first and third word areas 1280-1 and 1280-3, first and third word indications 1282-1 and 1282-3, grid 122 and display 1291 are also shown.

Figure 13:
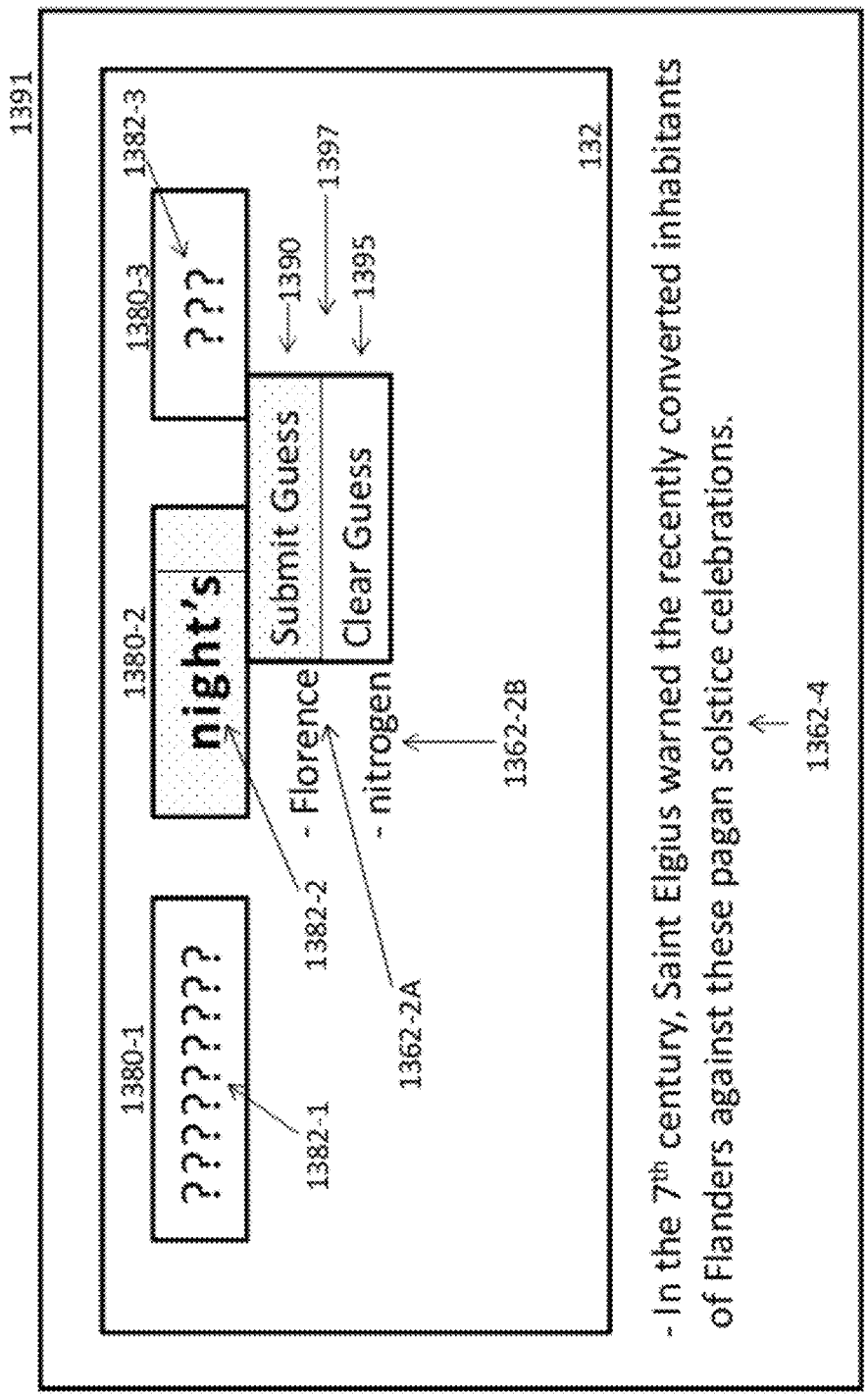

FIG. 13 shows the sample phrase after further progression. Second word area 1380-2 is in entry mode and has had its word mask completely overwritten by text input, which has caused menu 1397 to display. Menu 1397 includes 'submit guess' menu item 1390 which is selected and will cause the text shown as second word guess 1382-2, entered in second word area 1380-2 to be submitted for system validation. 'Clear guess' menu item 1395 clears second word guess 1382-2 and restores the full indication mask in second word area 1380-2 (not shown). Clues 1362-2A (partially covered by menu 1397), 1362-2B, 1362-4, first and third word areas 1380-1 and 1380-3, first and third word indications 1382-1 and 1382-3, grid 132 and display 1391 are also shown. In the present example, the typed guess is correct, and the 'solve-the-phrase' display will return with second word solution "night's" in the second word area, which will no longer accept user input (not shown).

Figure 14:
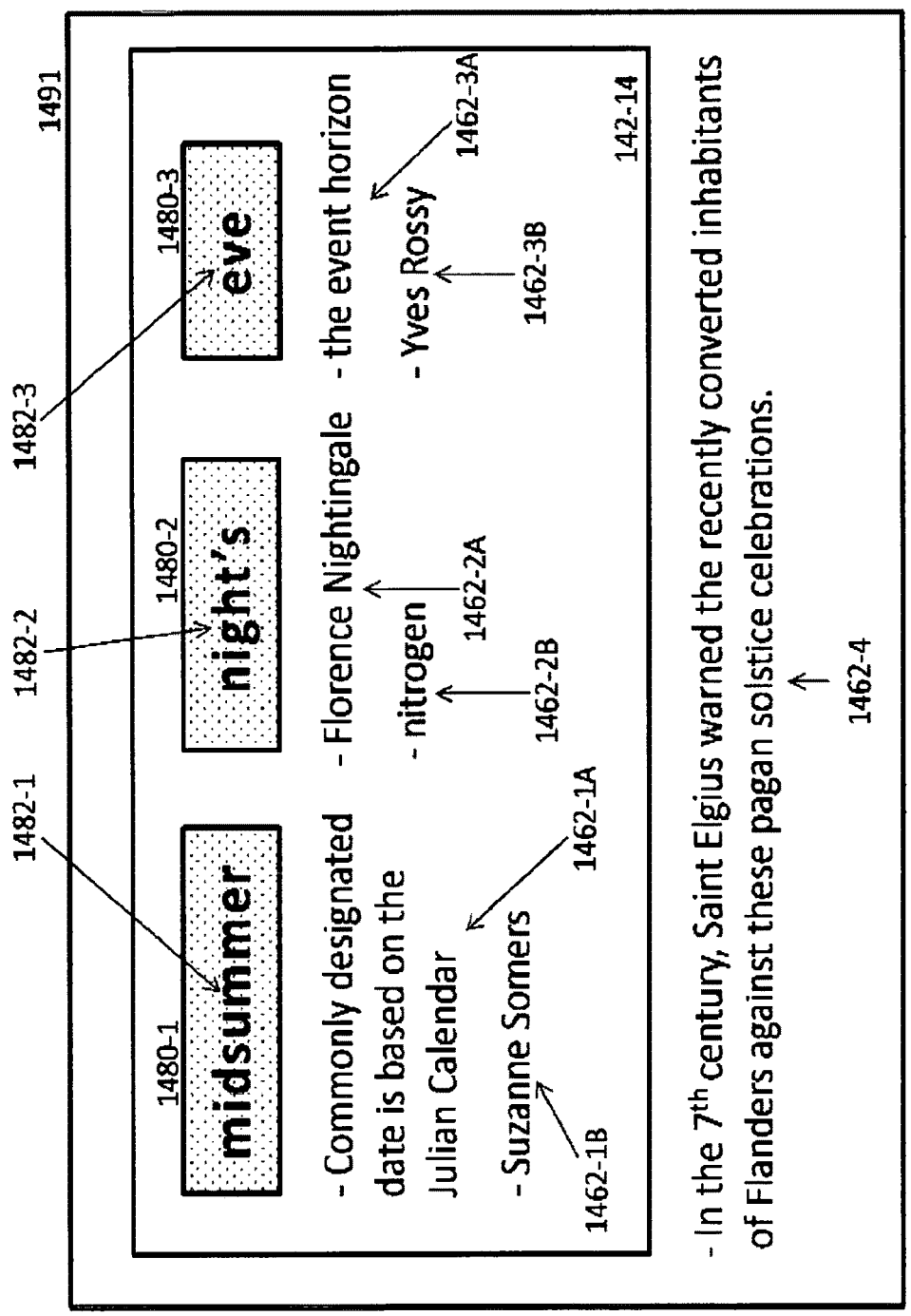

FIG. 14 shows the 'solve-the-phrase' display at the end of the sample round of play. Clues 1462-1A and 1462-1B correspond to first word solution 1482-1 "midsummer" which is displayed in first word area 1480-1. Clues 1462-2A and 1462-2B correspond to second word solution 1482-2 "night's" which is displayed in second word area 1480-2. Clues 1462-3A and 1462-3B correspond to third word solution 1482-3 "eve" which is displayed in third word area 1480-3. Clue 1462-4 corresponds to the phrase in its unity. No other input towards solving the words or phrase is accepted and the sample phrase is finished. Grid 142-14 and display 1491 are also shown.

The solve-the-phrase interface comprises a level-two quiz interface wherein each word with trivia quizzes associated to it represents a level-two quiz solution. It also incorporates a similar level-two quiz interface wherein the phrase as a whole can have trivia quizzes associated to it. The solve-the-phrase interface incorporates a level-one quiz selector mechanism for selecting trivia quizzes associated to the words. It incorporates a similar mechanism for selecting trivia quizzes associated to the phrase. The trivia quiz dialog is a level-one quiz interface.

creation, package name of the original Java file, where applicable, and original file extension (Quizoku is a Registered Trademark):

| Name | Size (bytes) | Date of Creation | Package | Extension |
|---|---|---|---|---|
| Quizoku.txt | 72,006 | Mar. 19, 2012 | com.quizoku.gui | java |
| TriviaQuizDialog.txt | 21,202 | Mar. 19, 2012 | com.quizoku.gui | java |
| SplashScreen.txt | 2,133 | Mar. 19, 2012 | com.quizoku.gui | java |
| QuizOriginator.txt | 529 | Mar. 19, 2012 | com.quizoku.gui | java |
| GuessThePhraseMode.txt | 608 | Mar. 19, 2012 | com.quizoku.gui | java |
| Factoid.txt | 1,017 | Mar. 19, 2012 | com.quizoku.model | java |
| FactoidFile.txt | 1,319 | Mar. 19, 2012 | com.quizoku.model | java |
| FileType.txt | 475 | Mar. 19, 2012 | com.quizoku.model | java |
| Hint.txt | 1,529 | Mar. 19, 2012 | com.quizoku.model | java |
| HintFile.txt | 1,304 | Mar. 19, 2012 | com.quizoku.model | java |
| Phrase.txt | 12,517 | Mar. 19, 2012 | com.quizoku.model | java |
| PhraseModel.txt | 15,173 | Mar. 19, 2012 | com.quizoku.model | java |
| QuizWord.txt | 12,248 | Mar. 19, 2012 | com.quizoku.model | java |
| Reference.txt | 1,190 | Mar. 19, 2012 | com.quizoku.model | java |
| ReferenceCategory.txt | 537 | Mar. 19, 2012 | com.quizoku.model | java |
| ReferenceHint.txt | 774 | Mar. 19, 2012 | com.quizoku.model | java |
| Revealable.txt | 741 | Mar. 19, 2012 | com.quizoku.model | java |
| RevealableString.txt | 926 | Mar. 19, 2012 | com.quizoku.model | java |
| TriviaAnswer.txt | 542 | Mar. 19, 2012 | com.quizoku.model | java |
| TriviaAnswerFile.txt | 1,435 | Mar. 19, 2012 | com.quizoku.model | java |
| TriviaCategory.txt | 774 | Mar. 19, 2012 | com.quizoku.model | java |
| TriviaChoice.txt | 1,064 | Mar. 19, 2012 | com.quizoku.model | java |
| TriviaChoiceFile.txt | 1,656 | Mar. 19, 2012 | com.quizoku.model | java |
| TriviaQuestion.txt | 590 | Mar. 19, 2012 | com.quizoku.model | java |
| TriviaQuestionFile.txt | 1,354 | Mar. 19, 2012 | com.quizoku.model | java |
| TriviaQuiz.txt | 7,070 | Mar. 19, 2012 | com.quizoku.model | java |
| TriviaQuizMC.txt | 4,558 | Mar. 19, 2012 | com.quizoku.model | java |
| UnmarshalledPhrase.txt | 1,110 | Mar. 19, 2012 | com.quizoku.model | java |
| UnmarshalledPhraseNoValidation.txt | 1,812 | Mar. 19, 2012 | com.quizoku.model | java |
| Word.txt | 1,325 | Mar. 19, 2012 | com.quizoku.model | java |
| AnswerType.txt | 2,263 | Mar. 19, 2012 | com.quizoku.schema | java |
| ChoiceType.txt | 2,807 | Mar. 19, 2012 | com.quizoku.schema | java |
| FactoidType.txt | 2,269 | Mar. 19, 2012 | com.quizoku.schema | java |
| HintType.txt | 3,008 | Mar. 19, 2012 | com.quizoku.schema | java |
| MultipleChoiceQuizType.txt | 2,682 | Mar. 19, 2012 | com.quizoku.schema | java |
| ObjectFactory.txt | 4,037 | Mar. 19, 2012 | com.quizoku.schema | java |
| package_info.txt* | 675 | Mar. 19, 2012 | com.quizoku.schema | java |
| Phrase_.txt** | 7,048 | Mar. 19, 2012 | com.quizoku.schema | java |
| QuestionType.txt | 2,275 | Mar. 19, 2012 | com.quizoku.schema | java |
| QuizType.txt | 5,977 | Mar. 19, 2012 | com.quizoku.schema | java |
| QuizWordType.txt | 3,648 | Mar. 19, 2012 | com.quizoku.schema | java |
| ReferenceHintType.txt | 2,256 | Mar. 19, 2012 | com.quizoku.schema | java |
| ReferenceType.txt | 4,737 | Mar. 19, 2012 | com.quizoku.schema | java |
| WordType.txt | 2,289 | Mar. 19, 2012 | com.quizoku.schema | java |
| quizoku_002.txt | 13,967 | Mar. 19, 2012 | N/A | xml |
| quizoku_.txt*** | 5,225 | Mar. 19, 2012 | N/A | xsd |

*File name in development environment is package-info.java
**File name in development environment is Phrase.java
***File name in development environment is quizoku.xsd The solve-the-phrase interface also comprises a different type of level-two quiz interface from that generally described in the exemplary embodiment. The phrase solution represents a level-two quiz solution, and the revealed words of the phrase are level-two quiz clues to it. At least some of these clues can be provided when a player solves the word with the assistance of word clues, representing a level-one quiz in that context. Thus, the solve-the-phrase interface also comprises a different type of a level-one quiz interface. There are actually three levels of quiz solving offered through linked, two-level quizzes.

Practice Embodiment: Program Design

This nonprovisional application incorporates-by-reference a computer program listing appendix with the following files, shown with size information in bytes, date of Entries in the "Name" column match the file name as submitted with the computer program listing appendix. The working filename extension is provided in the "Extension" column. This extension would replace the 'txt' extension in the development environment or, in the case of quizoku_002.xml, at runtime. The "Date of Creation" is the date of creation of the text files.

According to the Java programming language, Java classes are saved as files having the class name and a "java" file extension. The classes discussed herein are thereby identified by their corresponding file names under the provided program listing and as noted.

The code responsible for the display of a graphical user interface is contained in the com.quizoku.gui Java package. The model code that manages the quiz data and state information is contained in the com.quizoku.model package.

The schema code, created from an XSD schema definition using Java tools, is contained in the com.quizoku.schema package.

Clue, solution, and other quiz data element types are defined in the model using object oriented design. Data elements are displayed in the GUI according to their type in the model. Persistent clue, solution, and other quiz data element types are defined in the schema, which corresponds to the model.

A class for a level-one trivia quiz level, TriviaQuiz, includes attributes for a trivia quiz, including a question from the TriviaQuestion model class, and a solution from the TriviaAnswer class. Getter and setter methods for the attributes, and constructors, are included in the TriviaQuiz class. Also included are overloaded validateGuess methods comprised by a level-one quiz validation means. TriviaQuizMC is a subclass of TriviaQuiz for a multiple choice type of trivia quiz, and includes an array of trivia choice attributes from the TriviaChoice class. In the practice embodiment, all trivia quizzes are of the multiple choice type.

The instance of the text attribute of the TriviaChoice instance for the correct choice is the level-one quiz solution data element. In the practice embodiment, the level-one quiz solution data element is also a level-two quiz clue data element. Within an instance of the TriviaQuestion class is an instance of a text attribute, which is a level-one quiz clue data element.

A class named QuizWord, has an array of TriviaQuiz attributes, named triviaQuizzes. The text attribute of a QuizWord instance is the level-two quiz solution data element for a level-two quiz. This text attribute originates from the RevealableString class, which is the superclass of Word, which is the superclass of QuizWord.

The com.quizoku.gui package contains classes for interactively displaying model data within a Java applet. The Quizoku class provides an interactive display as shown in FIGS. 5, 6, and 9-14. The Quizoku class displays an array of masked word indications, each similar to 382A of FIG. 3. The Quizoku class has the following additional features. An array of Word attributes in Quizoku, called modWord, stores an array of words and quiz words from the model. Quiz words have trivia quizzes associated to them and regular words do not. An array of JFormattedTextField named viewWords is used to visually represent an indication of each word and quiz word from the model prior to its solution, and display each word following its solution (see for example 580-1, 580-2, and 580-*n*). Each word or quiz word is associated to a JPopupMenu named wordPopUpMenu (692), which has submenus and menu items that are added to it. For quiz words, a submenu of type JMenu, named wordPopupMenuEarnClue (620) is used to select level-one quiz categories and thereby a trivia quiz. A menu item (610) for wordPopupMenuEarnClue (620) is shown. A JMenuItem, named aQuizCatMenuItem is added to wordPopupMenuEarnClue for each category having one or more trivia quizzes in it that are applicable to its given quiz word (622, 624, 626). In embodiments without level-one (trivia quiz) quiz categorization, a JMenuItem could be used to select a trivia quiz. A JMenuItem named wordPopupMenuItemGuessWord (670) is also added to wordPopUpMenu, presenting an option to make an attempt at a level-two ('solve the word') quiz solution. The Quizoku class also includes an array of Box components (560-1, 560-2, 560-*n*), named gtpWordClueHolder (for 'guess-the-phrase word clue holder'). Each Box comprised by gtpWordClueHolder is positioned beneath a quiz word indication provided by the viewWords array, and is a container for displaying one or more level-two ('solve the word') quiz clues pertaining to the quiz word.

The TriviaQuizDialog class provides an interactive multiple choice trivia quiz display as shown in FIGS. 7 and 8. TriviaQuizDialog has a JRadioButton object for each multiple choice option. The text attribute of each JRadioButton instance is set with the text attribute of a TriviaChoice instance from the model. An activating means for enabling a player to activate the display of a quiz or puzzle clue or question within the gameplay sequence is provided. An instance of the Quizoku class is used to display an instance of the TriviaQuizDialog class using event driven programming.

The incorporated code further includes level-one quiz categorization means, level-one quiz category display means, level-one quiz category selection means, and category-and-quiz integration means for providing a modified gameplay sequence. This gameplay sequence includes the display of a plurality of level-one quiz categories, and the selection of a level-one quiz category in order to display a new level-one quiz clue. First, wordPopUpMenu (692) containing menu items (610, 670, 693, and 695) is created by an event generated when a player, using a mouse or similar device, selects a viewWord (680-2) from the viewWords array while it is displaying a word indication (682-2) in indication mode. Next, a player selects menu item (610) for wordPopupMenuEarnClue (620), then a category aQuizCatMenuItem (622). The subsequent display of a trivia quiz is accomplished by an event listener added to each aQuizCatMenuItem (622, 624, 626), shown by this code snippet from Quizoku.java:

```
...
JMenuItem aQuizCatMenuItem;
aQuizCatMenuItem = new JMenuItem( sb.toString( ),
quizokuMenuItemIcon );
aQuizCatMenuItem.addMouseListener(new MouseAdapter( ) {
   public void mouseReleased( MouseEvent e ) {
     maybeShowQuiz(e);
   }
   private void maybeShowQuiz( MouseEvent e ){
        viewWord.setBackground( gtpWordHotBackground );
        modWordNum = modWord.indexOf( aModWord );
        System.out.println( "modWordNum: " + modWordNum );
        quizOriginator = QuizOriginator.WORD;
        modQuiz = currModQuizWord.getTriviaQuiz( aTriviaCategory );
        TriviaQuizDialog triviaQuizDialog = new
        TriviaQuizDialog( thisQuizoku );
        triviaQuizDialog.setVisible( true );
   }
 }
);
aQuizCatMenuItem.setEnabled( true );
wordPopupMenuEarnClue.add( aQuizCatMenuItem );
...
```

Where sb is a string buffer variable containing the text of a category obtained from the model that is displayed on the aQuizCatMenuItem category. This snippet shows how a new TriviaQuizDialog object is created by handling a MouseEvent initiated by a player by clicking on a displayed aQuizCatMenuItem category. A reference to thisQuizoku, the current instance of Quizoku, is passed to the TriviaQuizDialog constructor, in part to display an appropriate trivia quiz, as managed by the model. This code is part of a category-and-quiz integration means.

Text variable correctAnswer identifies a level-two quiz clue, as well as the level-one quiz solution. It is set with the text for the correct trivia quiz response aTriviaChoice as shown by this code snippet from TriviaQuizDialog:

```
...
    for (TriviaChoice aTriviaChoice : choice) {
        if ( aTriviaChoice != null ){
            if ( aTriviaChoice.getIsCorrect( ) == true ){
                correctAnswer = aTriviaChoice.getText( );
            ...
```

The TriviaQuizDialog object initializes a JLabel called newClue with correctAnswer and some added text formatting. This is accomplished by adding an event listener to an instance of a close button component closeButton, as shown by the following code snippet from TriviaQuizDialog.java:

```
...
closeButton.addActionListener( new ActionListener( ) {
    public void actionPerformed(ActionEvent cbe) {
        JLabel newClue = null;
        if ( quizoku.quizOriginator == QuizOriginator.WORD ){
            if ( correctAnswer != null ){
                newClue = new JLabel("– " + correctAnswer );
            }
            if ( newClue != null ){
                dispose( );
                newClue.setVisible( true );
                quizoku.gtpWordClueHolder.get(quizoku.modWordNum)
                    .add( newClue);
                quizoku.gtpHolder.validate( );
                for ( JTextField aViewWord : quizoku.viewWords ) {
                    if ( quizoku.modWord.get(
                        quizoku.viewWords.indexOf( aViewWord )
                        ).isRevealed != true ){
                            aViewWord.setBackground(
                                quizoku.gtpWordNormalBackground );
                    }
                }
                for ( JTextField aViewWord : quizoku.viewWords) {
                    aViewWord.validate( );
                }
                for ( Box aWordClueHolder : quizoku.gtpWordClueHolder ) {
                    aWordClueHolder.validate( );
                }
                quizoku.gtpHolder.validate( );
                quizoku.repaint( );
            }
        }
        if ( quizoku.quizOriginator == QuizOriginator.PHRASE ){
            if ( correctAnswer != null ){
                newClue = new JLabel( "– " + correctAnswer );
            }
            if ( newClue != null ){
                dispose( );
                newClue.setVisible( true );
                quizoku.gtpHintHolder.add( newClue );
                quizoku.gtpHolder.validate( );
                quizoku.gtpHintHolder.validate( );
                quizoku.repaint( );
            }
        }
    }
});
...
```

The following line in the previous code snippet:
quizoku.gtpWordClueHolder.get(quizoku.modWordNum).add(newClue);
describes newClue (962-2), obtained from the level-one (trivia quiz) quiz, being added to the gtpWordClueHolder box (see for example 560-2) at the array number corresponding to the viewWord (980-2) from the viewWords array that had its aQuizCatMenuItem category (622) selected. This is part of a level-two quiz clue display means. The current TriviaQuiz object in focus is disposed, and the Quizoku object quizoku is repainted, displaying the viewWords array in the appropriate state, with a new clue under the appropriate viewWord quiz word.

Also included is a level-one quiz attempt input means for inputting an attempt at a level-one trivia quiz solution. The multiple choice choices are provided in an array of JRadioButton called choiceRadioButton (741, 742, 743, 744), as shown in the TriviaQuizDialog class. Also included is a level-one quiz validation means. A player selects a JButton named submitButton (745) to initiate validation of an aTriviaChoice object corresponding to a selected choiceRadioButton (742). The submitButton event is handled to call the getIsCorrect method of the aTriviaChoice object in the TriviaChoice class. A JLabel named guessResult (893) displays the validation result.

The practice embodiment also includes indicating means for displaying an indication of the solution comprised by a level-two ('solve the word') trivia quiz. The indicating means graphically indicates the solution, but does not reveal it. As shown in the Quizoku class, this involves setting a masking character of type String, which is different for quiz words and regular words, and named qwPlaceHolderChar for quiz words in the practice embodiment. A new MaskFormater object named formatter is created and used in the initialization of each viewWord. A StringBuffer maskSB is populated with a qwPlaceHolderChar for each character of a given quiz word aModWord, and the setMask method of the formatter object is called with the String value of maskSB to set the indication of the corresponding viewWord.

The game also includes level-two quiz attempt input means for inputting an attempt at the level-two (solve-the-word) quiz solution, as shown in the Quizoku class. A mouse listener is added to the wordPopupMenuItemGuessWord menu (1170) in order to handle a mouse event. If a word was selected by the wordPopupMenuItemGuessWord menu, the listener determines which quiz word or regular word it was, and sets its viewWord to editable mode for allowing text input. As text is entered from a keyboard, each masking character is overwritten in the viewWord display by the typed character (1280-2).

There is also a level-two quiz validation means for validating the attempt. Each viewWord has a KeyListener added to it with the addKeyListener method. The KeyListener includes a keyReleased method that handles an event generated when a key is typed from a keyboard. The keyReleased method checks whether all of the masking characters have been overwritten each time a key is typed. When they have been, it causes a JPopupMenu named wordValidatePopUpMenu (1397) to display. JPopupMenu wordValidatePopUpMenu in turn has a JMenuItem named wordValidateMenuItem (1390). JMenuItem wordValidateMenuItem has a mouse listener added to it, so that when it is selected, it compares the text (1382-2) of the current viewWord (1380-2) with the text of the corresponding modWord in the model. If the submitted text matches the model, the viewWord is made uneditable, and other display properties are changed to reinforce that the word has been solved. The state of the corresponding word in the model is set to take account of the fact that the word is revealed. The level-two quiz attempt input means and the level-two quiz validation means are comprised by a level-two quiz solving means.

The practice embodiment is implemented in computer software, and runs on various computer systems having a Java Virtual Machine. In the embodiment, gameplay consists of a point-and-click quiz interface, as well as typing of text for each phrase word in order to submit a guess on a physical or on-screen touch keyboard. A mouse or touch screen could facilitate the point-and-click interface.

Practice Embodiment: Data Aspect

The practice embodiment uses a data aspect to relate a level-one quiz with a level-two quiz based on data. This is accomplished with a schema definition, named quizoku.xsd, defined using the XML Schema Definition (XSD), and one or more XML documents that conform to the schema definition, for example, quizoku_002.xml. The text of both files is included with this application and is incorporated by reference.

Each XML document defines a quiz-tree data structure designed to be used by the application to present one game iteration. An XML nesting structure allows a persistently stored level-two quiz clue to be related to a persistently stored level-one quiz. The computer program unmarshals text data contained in an XML file and creates the runtime objects defined in the model layer of computer code. This is shown particularly in the PhraseModel and UnmarshalledPhrase classes in the practice embodiment. An instance of the PhraseModel class creates a new UnmarshalledPhrase object named up with a schema Phrase named p, which has quiz data loaded from an XML document. The instance of PhraseModel also creates a new Phrase model object named phrs. It creates the objects and attributes, or data elements, of the model phrase. It also creates corresponding objects and attributes, or data elements, of the schema phrase. These are each indicated with "Schm" at the end of their name. PhraseModel then prepares phrs by loading all of the objects and data elements of the schema phrase p, one-for-one, into the corresponding objects and data elements of the model phrase phrs.

The system is designed so that the same computer program and XSD will allow for a large variety of quiz-trees. For example, the XSD, and the practice embodiment code all use arrays so that the number of words in a phrase is variable. The computer program will display or not display certain elements based on the underlying XML data. This includes optional components, such as factoids and hints. Occasionally, the XSD will be updated to accommodate new features, and backwards compatibility with older versions of the computer program is desirable. In the practice embodiment, which features multiple choice trivia, a clue is displayed regardless of whether the quiz challenge is correctly answered. This behavior is fixed in the application program.

The following chart summarizes the XML elements used in building a quiz tree data file in the practice embodiment, indicating where each element is typically nested. It describes the schema definition of the text file included with this specification corresponding to quizoku.xsd.

| Element | Nested Under | Type | Description |
| --- | --- | --- | --- |
| <qku:phrase> | top level element under schema | a complex type | contains a quiz tree structure |
| <qku:word> | <qku:phrase> | "WordType" | a word in the phrase that does not have quizzes or hints associated to it |
| <qku:word> | <qku:phrase> | "QuizWordType" (base WordType) | a word in the phrase that can have quizzes or hints associated to it |
| <qku:hint> | <qku:quizword>; <qku:phrase> | "HintType" | a hint associated with the word (or phrase) it is nested under |
| <qku:quiz> | <qku:quizword>; <qku:phrase> | "QuizType" | a trivia quiz associated with the word (or phrase) it is nested under |
| <qku:quiz> | <qku:quizword>; <qku:phrase> | "MultipleChoiceQuizType" (base QuizType) | A multiple choice trivia quiz associated with the word (or phrase) it is nested under. In present embodiments, this is only QuizType used. |
| <qku:triviaCategory> | <qku:quiz>; <qku:hint> | String | contains a category used to categorize each quiz (or hint) |
| <qku:question> | <qku:quiz> | "QuestionType" | nests the quiz question text |
| <qku:answer> | <qku:quiz> | "AnswerType" | nests the quiz answer text (not used for MultipleChoiceQuizType) |
| <qku:choice> | <qku:quiz> (only MultipleChoiceQuizType) | "ChoiceType" | contains one multiple choice option for a MultipleChoiceQuizType quiz. |
| <qku:text> (under choice) | <qku:choice> | String | Text component of one multiple choice option. In the practice embodiment, the text belonging to the choice with isCorrect = true becomes the word (or phrase) clue. |
| <qku:isCorrect> | <qku:choice> | Boolean | boolean indicating if the choice is correct (true) or incorrect (false). |
| <qku:questionMMComponent> | <qku:quiz> | "ResourceType" | contains a reference to a multimedia component to be displayed with the quiz question |
| <qku:factoid> | <qku:quiz>; <qku:phrase> | "FactoidType" | contains a factoid that may be selected/displayed after a quiz is validated |

-continued

| Element | Nested Under | Type | Description |
|---|---|---|---|
| <qku:resource> | <qku:quiz>; <qku:phrase> | "ResourceType" | Contains a 'resource location' (with URL) and descriptive information that can be used in the game. Can be selected/displayed after a quiz (or the phrase) is validated. |

Persistent data element types are defined in the XSD and are recognized by the computer program. A text element under a <qku:word> element of type QuizWordType is a persistently stored level-two quiz solution, comprised by a persistently stored level-two quiz. A text element under a <qku:question> element is a persistently stored level-one quiz clue, comprised by a persistently stored level-one quiz. A <qku:text> element of the correct <qku:choice> element is the persistently stored level-one quiz solution, comprised by a persistently stored level-one quiz. It is also a persistently stored level-two quiz clue, comprised by a persistently stored level-two quiz. The nesting of a <qku:text> element of a correct <qku:choice> element within a <qku:quiz> element of type MultipleChoiceQuizType defines a persistently stored relationship between a persistently stored level-two quiz clue and a persistently stored level-one quiz. This persistently stored relationship is furthermore based on the fact that the practice embodiment software program recognizes the text of the correct level-one quiz choice to be a level-two quiz clue. This persistently stored relationship provides for a <qku:text> element of a correct <qku:choice> element to have a dual role as a persistently stored level-two quiz clue, comprised by a persistently stored level-two quiz, and a persistently stored level-one quiz solution, comprised by a persistently stored level-one quiz.

Advantages

The present embodiments provide an entertaining new way to build general knowledge and vocabulary, sustaining interest until the top solution is achieved. Other quiz types could emphasize other skills, including logic, mathematics, language and music. Embodiments could also include an integrated story, quest, or adventure. There is also application to electronic marketing. For example, the top level phrase can represent the name of a product or title. Database marketing and Internet marketing strategies could be used to present quiz trees with specific promotions to target audiences or players. Elements of a quiz tree could have embedded promotional links or information. The embodiments are also relevant to being played on, distributed through, and adapted for social networks. A quiz tree builder interface accompanied by a database could be used to allow participants to build their own quiz trees.

Conclusions, Ramifications, and Scope

Ramifications are presented with reference to the GUI and data aspects, for both of the exemplary and practice embodiments. The scope of the invention should be determined not by the embodiments illustrated, but by the appended claims and their legal equivalents.

Ramifications: Exemplary Embodiment: Graphical User Interface Aspect

In alternative embodiments, receiving a level-two quiz clue in the gameplay sequence can be made contingent on the guess submitted for the level-one quiz being validated to be correct. Receiving the level-two quiz clue can also be based on some other contingency, perhaps in addition to guess correctness. For example, it can be based on a random factor or a game of chance. It may also be interrupted, or subject to some choice by a player.

The designated display of mechanism 210 is not required for all embodiments with an activating means. For example, mechanism 220 could provide an activating means. This might be the case in embodiments where level-one quiz categories are displayed automatically or always. In alternative embodiments, mechanism 270 will not be distinctly displayed. For example, a player could select area 280, or some other entry or selection area to initiate the inputting of a guess. In the practice embodiment, mechanism 270 is presented as a menu item. In alternative embodiments, mechanism 290 may not be distinctly displayed. For example, a guess will be submitted after a certain sequence of events, a correct number of characters have been typed, or a certain amount of time has elapsed. In other embodiments, mechanism 290 will be displayed differently. For example, in the practice embodiment a menu item is used.

A popup window (not shown) could be included to inform a player whether or not their guess at the level-one quiz was correct. A popup window (not shown) could also display the level-two quiz clue prior to it being added to area 260D, or display some other post-answer text. A popup window (not shown) could be included to inform a player whether or not their guess at the level-two quiz was correct. All components of interface 22A need not be shown simultaneously or on the same screen. For example, at the beginning of play, an indication representing the solution to the level-two quiz may be displayed in area 280, but area 260A might not be displayed. Also, all components of interface 26 need not be shown simultaneously or on the same screen.

While one level-two quiz clue is shown to be received for each level-one quiz taken, the number could be variable. Also, a variable number of level-one quizzes could be required to be taken before one or more level-two quiz clues are displayed.

Also:
  a selection list of words can replace the typing of each word guess;
  a blank space identified as such can replace a character per se as a masking character for each letter of each hidden word;
  the length of each hidden word need not be indicated;
  other indicating means can be used;
  individual letters of a word or phrase can be made selectable and subject to a quiz that will reveal a clue to the letter or else reveal the letter;
  a selection list of all letters in the alphabet could be added to the interface, and those occurrences of the letter in a hidden word or phrase will be displayed on selection of a letter, perhaps at some cost in an accompanying scoring system;

embodiments can be integrated with games of chance;

text-entry quiz-challenges could replace multiple choice selection;

level-one and level-two quiz interfaces and the quiz selector mechanism can be shown separately or simultaneously;

level-one and level-two quiz interfaces and the quiz selector mechanism can be integrated in a single window, frame, or screen, or may appear in separate windows, frames, or screens;

components providing game functionality embodied in the level-one and level-two quiz interfaces, and the quiz selector mechanism, can be distributed in multiple windows, frames, or screens;

level-one and level-two quiz clues or questions need not be displayed in designated areas, for example, each could display in its own window or frame;

there could be multiple level-one quiz clues or questions per level-one quiz, which might be progressively revealed;

audial and multimedia level-one and level-two quiz clues are possible;

'displaying' an audial clue means playing the sound;

the level-one quiz clue or question area or the display area for level-two quiz clues could contain an icon, link or summary display of a clue which could be expanded by player input;

level-one, or trivia quiz sub-categorization can be added;

the same level-one, or trivia quiz category could be displayed multiple times in the interface, as opposed to including all quizzes under a category in a single display of that category;

a categorization mechanism for choosing two-level quizzes can be added;

various types of level-one quiz, or two-level quiz categorization could be created based on, for example, demographics, language, age, difficulty, subject matter, price, media types, or problem, puzzle, or quiz type;

embodiments might adopt analytics and feedback mechanisms, for example to display quizzes of appropriate difficulty or subject matter, or including targeted promotions, based on player history;

general knowledge trivia quizzes and solve-the word and phrase puzzles could be substituted or included with anagrams, logic quizzes, math quizzes, picture puzzles, riddles, and other puzzle and quiz types;

the scoring system could be eliminated or modified;

single and multi-player versions and modes can be offered;

timing devices can be used, for example, to facilitate competition in a multiplayer version or mode, to limit the time within which a level-one or level-two quiz can be solved, and as a basis for an accompanying scoring system;

in multi-player formats, steps in the gameplay sequence, as well as optional steps, may be distributed among different players and the multi-level quiz may be shown in different states to different players;

multi-player formats can allow guessing by multiple players and a token or first-in system can be used to decide which guess to validate or the priority of guess validation among players;

in some embodiments, the same or only player can guess multiple times at the same level-one quiz;

in some embodiments, guessing continues until a guess at the level-one quiz is validated to be correct;

multiplayer variations could have one player select or make quizzes for another player;

a level-one quiz may be displayed without being selected by a player in some embodiments, for example, it could pop up after a certain amount of time;

embodiments might substitute standard computer validation of either level-one or level two quiz guesses with some other form of validation, for example, player or audience validation employing a consensus system, a referee, and/or Internet search;

the display mode of the indication/entry/display area for the level-two quiz solution could be optional, for example in an embodiment that closes or reinitializes the level-two quiz interface immediately after validation or does not distinguish a display mode from an entry mode;

the indication/entry/display area for the level-two quiz solution could be replaced with one or more separate areas each representing one or two of the indication, entry, or display modes;

a level-two quiz clue need not be an element of the preceding level-one quiz in all embodiments;

a level-two quiz clue need not have any predetermined relationship with the preceding level-one quiz in all embodiments;

the exemplary embodiment describes two levels of quiz-solving, but variations could have more levels, whereby, a level-two quiz could also be a level-one quiz relative to a different, level-two quiz;

in some embodiments, the level-one quiz interface and the level-two quiz interface could display two instances of the same quiz or puzzle type;

some televised game show and social media embodiments may have audiences and may incorporate audience participation;

embodiments can be played in an Internet browser; with a personal computer; with a tablet; with a game console; with a mobile device; with various hand held gaming devices, and;

embodiments may incorporate speech recognition or touch screens.

Ramifications: Exemplary Embodiment: Data Aspect

Enclosing level-two quiz clue element 462 within level-one quiz element 46 is a general method for defining some element, or part thereof, of a level-one quiz as being a clue to its nesting level-two quiz. Another method is for the corresponding GUI application to recognize a specific element of the level-one quiz as its corresponding level-two quiz clue. For example, the practice embodiment always uses the correct level-one quiz multiple choice answer as the level-two quiz clue. In that case, a specifically identified level-two quiz clue element is omitted from the schema and conforming XML documents. A specifically identified level-two quiz clue element could also be made an optional schema component, and the correct multiple choice answer used if the level-two quiz clue element is absent from the XML document for a given level-one quiz.

As shown in the exemplary embodiment, the level-two quiz clue can repeat some information contained in a data element of the level-one quiz that was displayed in a level-one quiz interface. This could also include post answer text or a 'factoid'. It could also comprise some information displayed via a URL that was accessed through a level-one quiz interface. In alternative embodiments, the level-two quiz clue need not be displayed in the level-one quiz interface, but it will nonetheless share some context with one or more pieces of information presented in the level-one quiz. The association could be based on subject matter, or vocabulary, for example. The level-one quiz element, or part thereof, might undergo additional formatting before being displayed as a clue to the level-two quiz, as in the practice embodiment. Alternative embodiments might use a level-one quiz element, or part thereof, as only a part of the level-two quiz clue.

An embodiment that replaces step 145 and forward with step 142 within operation 100E implies a type of data aspect. Such a data aspect would have significant differences from that described in the present embodiments. In such an embodiment, the level-two quiz would be specifically linked to one or more level-one quizzes. The level-one quiz solution(s) would not necessarily be stored. By such means, an accurate guess at a level-one quiz, while not necessarily validated, would be a useful clue to the level-two quiz.

Ramifications: Practice Embodiment: Graphical User Interface

Figure 15:
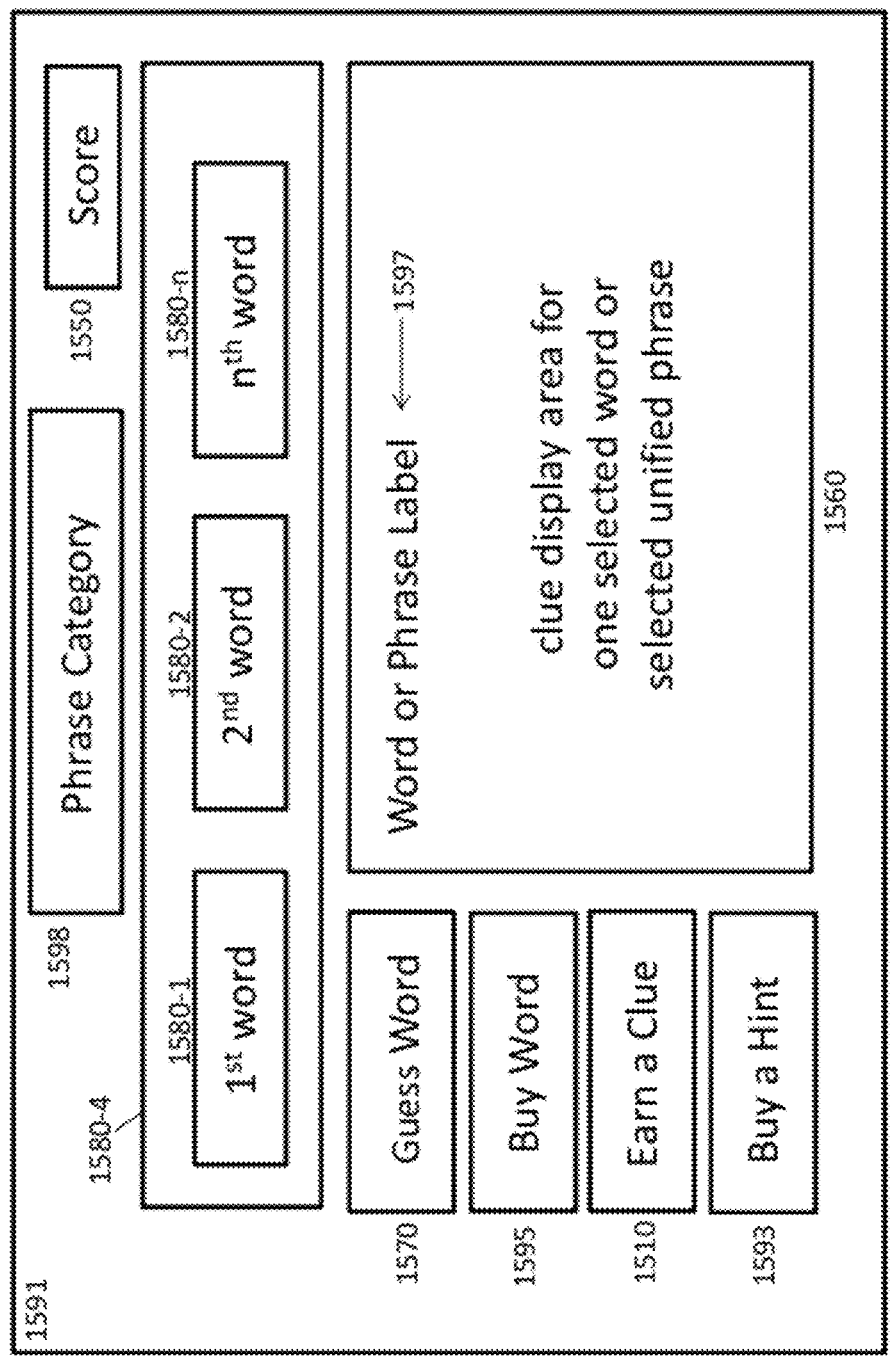
FIG. 15 shows a skeleton 'solve-the-phrase' interface for an embodiment with a common clue area.

In the practice embodiment, clues obtained by taking trivia quizzes are displayed in a corresponding clue area for each word. Each clue area is positioned beneath the word to which it is associated, and a separate area is used for clues to the unified phrase. FIG. 15 shows a skeleton 'solve-the-phrase' interface 1591 with a common clue area. A single, enlarged clue area 1560 appears below the phrase for the entire solve-the-phrase puzzle. The space made available for showing clues, obtained by taking trivia quizzes, to a given component of the phrase is increased by only showing them for one component at a time.

Only clues relevant to one of the words, displayed in word areas 1580-1, 1580-2, and 1580-n, or else to the entire phrase, are displayed at a given time. Selecting a particular word causes the clues for that word to be displayed (not shown). Once selected, backlighting of the selected word distinguishes it from the other words in order to indicate that any clue(s) displayed in area 1560 belong to it (not shown). Selecting an already selected and backlit word causes the clues for the unified phrase to be displayed (not shown). Accompanying backlighting of the area between a border surrounding the entire phrase 1580-4, and word areas 1580-1, 1580-2, and 1580-n, along with removal of backlighting from the previously backlit word area, denotes that any clue(s) displayed in area 1560 belong to the phrase as a whole (backlighting not shown). A label 1597 within clue area 1560 reinforces whether the clues are 'word clues' or 'phrase clues'.

Menus for, earning a clue to the selected component (a word or the phrase) 1510 (by taking a trivia quiz); buying a hint at the selected component 1593; buying a selected word 1595, and; guessing a selected word 1570, are docked in a common area. These menus are related to a selected word or else to the selected phrase. Backlighting of the selected component, as described, indicates which component the menus apply to. Menu 1510 causes a menu of trivia quiz categories to appear (not shown), from which a trivia quiz can be selected (not shown).

Any menu(s) that do not apply to the selected word or phrase are disabled (not shown). For example, if there is no supporting or remaining trivia quiz or hint data for a selected component, or if not enough points have been earned for the feature, a menu will be disabled accordingly. A scoring system grants points for correctly guessing at trivia quizzes and words. Players can buy hints and buy words using accumulated points. Cumulative score display area 1550 displays the score. A phrase category display area 1598 displays a category for the unified phrase.

In some embodiments, a selection mechanism displayed in the computer program interface allows a player to select a specific quiz tree for gameplay. In these other embodiments, quiz trees can be selected from categories, such as number of words, difficulty, language, interest, player age, price, if any, and quiz tree recency. In other embodiments, the system retrieves the corresponding XML file which is hosted on an Internet server.

Also:
credits with some real or virtual value could replace, or be combined with points in the scoring system;
the top-level phrase could be substituted with an ordered list or some other word or other puzzle type;
an adaptation could be made for compound words (for example, "hedgehog"), with quiz-challenges available on each joined word of the compound word, in place of, or within a phrase;
individual phrase words could be revealed automatically on solution of a trivia quiz, eliminating the intermediate challenge of solving individual words, in which case the phrase solution represents the level-two quiz solution;
hints, factoids, word buying, and 'giving up and showing the phrase', as defined, could be removed;
a feature supporting continuous typing of multiple words in a phrase is not required, and;
word indication masking characters need not be displayed while a guess is being typed.

Ramifications: Practice Embodiment: Data Aspect

The following chart summarizes additional XML elements not included in the practice embodiment. These elements can be used in other embodiments to provide a word clue that is not necessarily the correct multiple choice answer. This is designed similarly to the exemplary XML of FIG. 4 and its accompanying XSD. Also show is a tag to provide some post answer text that may be relevant to the word clue:

| Element | Nested Under | Type | Description |
|---|---|---|---|
| <qku:wordClue> | <qku:quiz> | String | The 'word' clue for the word (or phrase) the quiz is nested under. <optional: If not present for a quiz of type MultipleChoiceQuizType, then the multiple choice answer with isCorrect = true is the word (or phrase) clue. If not present and quiz is base QuizType, then <qku:answer> has the word (or phrase) clue.> |
| <qku:postAnswerText> | <qku:quiz> | String | contains some text that can be displayed with the quiz validation message |

A <qku:wordClue> element could replace the <qku:text> element of a correct <qku:choice> element as the persistently stored level-two quiz clue. The nesting of a <qku:wordClue> element within a <qku:quiz> element of type MultipleChoiceQuizType is a persistently stored relationship between a persistently stored level-two quiz clue and a persistently stored level-one quiz.

In yet other embodiments, the word (or phrase) clue will only display when a quiz-challenge guess is validated to be correct, as opposed to all of the time. Such behavior could be fixed by the application program, in which case all quiz-trees and quiz-challenges contained within could follow one behavior or the other for a given program version. Other embodiments could provide a single application program version to support different quiz-trees which follow one behavior or the other. In this case, an additional boolean tag could be defined under <qku:phrase> in the schema, for example <qku:displayClueOnlyOnCorrectGuess>, and included as a single tag in the XML quiz-tree documents. In yet other embodiments, behavior could be mixed within a quiz-tree, and perhaps made contingent on the quiz type of embedded quiz challenges. In that case, the proposed <qku:displayClueOnlyOnCorrectGuess> tag could be nested elsewhere, for example, under <qku:quiz> for greater flexibility. Alternately, the application program could be designed to default to one behavior or the other based on the subclass of <qku:quiz> in the schema and corresponding subclass rules in the model.

For embodiments including the data aspect, a level-one quiz need not be visually associated with a level-two quiz at the time the level-one quiz is displayed, according to some embodiments. For example, it would not be necessary to display an indication of a level-two quiz solution as the first step of a gameplay sequence, according to all embodiments.

Other schema definitions could support other embodiments. Other schema definitions, such as the Document Type Definition could be used. Other file formats, such as flat files or other Standard Generalized Markup Language variants can be used. In some embodiments, players can select a quiz-tree from selection menus. Also, quiz trees can be pushed to the client in a subscription model, for example, in the case where a player has opted to receive a 'quiz of the day'. The exemplary and practice embodiments both use one XML file per quiz tree, but other designs are possible. Quiz tree data can be distributed on local media as opposed to being downloaded from a web host. In other embodiments, the application program could read quiz data from a relational database using a local or Internet located relational database management system. Quiz data could also be accessed from web applications using web services. More elaborate enhancements could involve automated or real time construction of quiz-tree relationships, and decentralized data structures could reference data on the Internet and from other sources.

While the practice embodiment is based on text quizzes, other embodiments will include media elements, including pictures, sounds and video that can be referenced within an XML document by a file location and name. Media elements can be specified using a relative or absolute path, and can be downloaded by the computer program from a web server using Internet protocols. The source for the media elements could be a proprietary web server or diverse locations each indicated by Uniform Resource Locators (URLs).

Other embodiments will also provide persistence of quiz trees for each player, so that players can resume an in-progress quiz tree at a later time or in case of technical failure. To provide persistence, alternative embodiments will marshal the quiz data of an in-progress quiz tree back into an XML file. The marshalled XML file will include state information so that the quiz tree can be restored to each player in its last state. The XML file will record which elements are revealed, such as revealed words and quizzes, and score information.

The XML files themselves can be assembled in a variety of ways. Each quiz can be manually edited by a person somewhat familiar with XML. U.S. application Ser. No. 12/285,212 describes a quiz database and a quiz generator computer program sequence. Such a method could be used to enhance the quiz tree creation process. An intermediate solution is a computer program that can assemble an XML file from data loaded into a spreadsheet. Regardless of the method of XML document construction, validation is required prior to quiz-tree distribution in order to ensure that the assembled XML document conforms to the schema definition.

Related Applications

Related applications could provide the level-two quiz clue 262D at some other stage, for example, when a player guesses a level-one quiz 135, or selects a level-one quiz category 120, or when a level-one quiz clue is displayed 130. In such related applications, the guess and solution of the level-one quiz would be deferred until after the level-two quiz clue is provided.

In another related application, the level-two quiz could be a multiple choice quiz. A multiple choice solution choice data element for the level-two quiz might replace the level-two quiz clue obtained from the gameplay sequence as previously shown. Also, one or more level-two quiz solution choices could be indicated by an indicating means, instead of the (correct and only) solution. A player might activate a gameplay sequence, by selecting a level-one quiz corresponding to an indication of a level-two quiz solution choice. The level-two quiz solution choice would be revealed by a gameplay sequence, instead of a level-two quiz clue. A corresponding data aspect in this case would relate a level-one quiz data element with a level-two quiz solution choice data element, instead of a level-two quiz clue. In such an embodiment, the level-one quiz or quizzes might also be multiple choice quizzes. In that case, the level-one quiz data element related to a level-two quiz solution choice could be the correct solution of the level-one quiz. Other related applications could provide indications of different parts of a level-two quiz within the same embodiment. Also, different types of data elements, for example, clues and solution choices, could be retrieved by gameplay sequences for the same level-two quiz.

In other related applications, area 280 could represent a task. Components for completing the task could be retrieved via a gameplay sequence instead of level-two quiz clues.

What is claimed is:

1. A gaming system for playing a solve-the-phrase game that includes a plurality of trivia quiz questions, comprising: a display device generating a graphical user interface; a player input device; at least one processor; and a memory device which stores a plurality of instructions, which when executed by the processor, cause the processor to operate with the display device, the memory device, and the player input device to:
    a) display on the graphical user interface via the display device a solve-the-phrase puzzle including a plurality of unsolved words that form a phrase to be solved by a player, wherein the solve-the-phrase puzzle includes a correct phrase answer stored in the memory device;
    b) associate via the processor each of at least two unsolved words from the plurality of unsolved words of the solve-the-phrase puzzle with at least two trivia quiz questions, wherein each of the at least two trivia quiz questions associated via the processor with an unsolved word has a correct trivia quiz answer;

c) receive via the player input device a trivia quiz answer input from the player for each of the at least two trivia quiz questions associated via the processor with an unsolved word, for each of the at least two unsolved words from the plurality of unsolved words of the solve-the-phrase puzzle;

d) determine via the processor if the player's trivia quiz answer input for each of the at least two trivia quiz questions associated via the processor with an unsolved word matches the correct trivia quiz answer, for each of the at least two unsolved words from the plurality of unsolved words of the solve-the-phrase puzzle;

e) display on the graphical user interface via the display device the correct trivia quiz answer for each of the at least two trivia quiz questions associated via the processor with an unsolved word when it is determined via the processor if the player's trivia quiz answer input matches the correct trivia quiz answer at a location on the graphical user interface proximate to the unsolved word that is associated with the at least two trivia quiz questions; and also improve a game score for a correct trivia quiz answer input and/or worsen the game score for an incorrect trivia quiz answer input, for each of the at least two unsolved words from the plurality of unsolved words of the solve-the-phrase puzzle, wherein each correct trivia quiz answer provides a word clue to one of the at least two unsolved words from the plurality of unsolved words of the solve-the-phrase puzzle;

f) receive via the player input device a solve-the-phrase answer input that includes unsolved word answer inputs for the at least two unsolved words from the plurality of unsolved words of the solve-the-phrase puzzle from the player to complete the solve-the-phrase puzzle;

g) determine via the processor if the player's solve-the-phrase answer input matches the correct phrase answer, and when the player's solve-the-phrase answer input matches the correct phrase answer, display on the graphical user interface via the display device that the player's solve-the-phrase answer input is correct and display on the graphical user interface via the display device the game score.

2. A gaming system for playing a solve-the-phrase game that includes a plurality of trivia quiz questions, comprising: a display device generating a graphical user interface; a player input device; at least one processor; and a memory device which stores a plurality of instructions, which when executed by the processor, cause the processor to operate with the display device, the memory device, and the player input device to:

a) display on the graphical user interface via the display device a solve-the-phrase puzzle including a plurality of unsolved words that form a phrase to be solved by a player, wherein the solve-the-phrase puzzle includes a correct phrase answer stored in the memory device;

b) associate via the processor each of at least two unsolved words from the plurality of unsolved words of the solve-the-phrase puzzle with at least two trivia quiz questions, wherein each of the at least two trivia quiz questions associated via the processor with an unsolved word has a correct trivia quiz answer;

c) receive via the player input device a trivia quiz answer input from the player for each of the at least two trivia quiz questions associated via the processor with an unsolved word, for each of the at least two unsolved words from the plurality of unsolved words of the solve-the-phrase puzzle;

d) determine via the processor if the player's trivia quiz answer input for each of the at least two trivia quiz questions associated via the processor with an unsolved word matches the correct trivia quiz answer, for each of the at least two unsolved words from the plurality of unsolved words of the solve-the-phrase puzzle;

e) display on the graphic user interface via the display device the correct trivia quiz answer for each of the at least two trivia quiz questions associated via the processor with an unsolved word when it is determined via the processor that the player's trivia quiz answer input matches the correct trivia quiz answer at a location on the graphical user interface proximate to the unsolved word that is associated with the at least two trivia quiz questions, for each of the at least two unsolved words from the plurality of unsolved words of the solve-the-phrase puzzle, wherein each correct trivia quiz answer provides a word clue to one of the at least two unsolved words from the plurality of unsolved words of the solve-the-phrase puzzle;

f) receive via the player input device a solve-the-phrase answer input that includes unsolved word answer inputs for the at least two unsolved words from the plurality of unsolved words of the solve-the-phrase puzzle from the player to complete the solve-the-phrase puzzle;

g) determine via the processor if the player's solve-the-phrase answer input matches the correct phrase answer, and when the player's solve-the-phrase answer input matches the correct phrase answer, display on the graphical user interface via the display device that the player's solve-the-phrase answer input is correct.

3. A gaming system for playing a solve-the-phrase game that includes a plurality of trivia quiz questions, comprising: a display device generating a graphical user interface; a player input device; at least one processor; and a memory device which stores a plurality of instructions, which when executed by the processor, cause the processor to operate with the display device, the memory device, and the player input device to:

a) display on the graphical user interface via the display device a solve-the-phrase puzzle including a plurality of unsolved words that form a phrase to be solved by a player, wherein the solve-the-phrase puzzle includes a correct phrase answer stored in the memory device;

b) associate via the processor each of at least two unsolved words from the plurality of unsolved words of the solve-the-phrase puzzle with at least two trivia quiz questions, wherein each of the at least two trivia quiz questions associated via the processor with an unsolved word has a correct trivia quiz answer;

c) receive via the player input device a trivia quiz answer input from the player for each of the at least two trivia quiz questions associated via the processor with an unsolved word, for each of the at least two unsolved words from the plurality of unsolved words of the solve-the-phrase puzzle;

d) determine via the processor if the player's trivia quiz answer input for each of the at least two trivia quiz questions associated via the processor with an unsolved word matches the correct trivia quiz answer, for each of the at least two unsolved words from the plurality of unsolved words of the solve-the-phrase puzzle;

e) display on the graphical user interface via the display device data associated with the trivia quiz question for each of the at least two trivia quiz questions associated via the processor with an unsolved word when it is determined via the processor if the player's trivia quiz answer input matches the correct trivia quiz answer at a location on the graphical user interface proximate to the unsolved word that is associated with the at least two trivia quiz questions; and also improve a game score for a correct trivia quiz answer input and/or worsen the game score for an incorrect trivia quiz answer input, for each of the at least two unsolved words from the plurality of unsolved words of the solve-the-phrase puzzle, wherein the data associated with a trivia quiz question provides a word clue to one of the at least two unsolved words from the plurality of unsolved words of the solve-the-phrase puzzle;

f) receive via the player input device a solve-the-phrase answer input that includes unsolved word answer inputs for the at least two unsolved words from the plurality of unsolved words of the solve-the-phrase puzzle from the player to complete the solve-the-phrase puzzle;

g) determine via the processor if the player's solve-the-phrase answer input matches the correct phrase answer, and when the player's solve-the-phrase answer input matches the correct phrase answer, display on the graphical user interface via the display device that the player's solve-the-phrase answer input is correct and display on the graphical user interface via the display device the game score.

* * * * *